US012729953B2

(12) United States Patent
Sugawara et al.

(10) Patent No.: US 12,729,953 B2
(45) Date of Patent: Sep. 8, 2026

(54) INFORMATION PROCESSING SYSTEM, INFORMATION PROCESSING METHOD, AND RECORDING MEDIUM

(71) Applicant: NEC Corporation, Tokyo (JP)

(72) Inventors: Chisato Sugawara, Tokyo (JP); Yosuke Kimura, Tokyo (JP); Toshimichi Yokote, Tokyo (JP); Takakazu Ishii, Tokyo (JP); Daisuke Hashizume, Tokyo (JP); Hiromichi Hirata, Tokyo (JP); Shouhei Ohno, Tokyo (JP); Nana Jumonji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 125 days.

(21) Appl. No.: 18/727,472

(22) PCT Filed: Jan. 25, 2022

(86) PCT No.: PCT/JP2022/002534

§ 371 (c)(1),
(2) Date: Jul. 9, 2024

(87) PCT Pub. No.: WO2023/144860

PCT Pub. Date: Aug. 3, 2023

(65) Prior Publication Data

US 2025/0093150 A1 Mar. 20, 2025

(51) Int. Cl.
*G01B 11/16* (2006.01)
*G01B 11/02* (2006.01)

(52) U.S. Cl.
CPC .............. *G01B 11/16* (2013.01); *G01B 11/02* (2013.01)

(58) Field of Classification Search
CPC ................................ G01B 11/02; G01B 11/16
See application file for complete search history.

(56) References Cited

U.S. PATENT DOCUMENTS

2025/0020459 A1* 1/2025 Yamaguchi .............. G01C 7/04

FOREIGN PATENT DOCUMENTS

| | | | |
|---|---|---|---|
| JP | 2018-021375 | A | 2/2018 |
| JP | 2018-054540 | A | 4/2018 |
| JP | 2020-144079 | A | 9/2020 |
| JP | 2021-162868 | A | 10/2021 |
| WO | 2015/159469 | A1 | 10/2015 |
| WO | 2021/084696 | A1 | 5/2021 |
| WO | 2021/084698 | A1 | 5/2021 |

(Continued)

OTHER PUBLICATIONS

International Search Report for PCT Application No. PCT/JP2022/002534, mailed on Apr. 19, 2022.

(Continued)

*Primary Examiner* — Kevin K Pyo
(74) *Attorney, Agent, or Firm* — Sughrue Mion, PLLC

(57) ABSTRACT

An information processing system according to the present invention includes: a memory configured to store instructions; and one or more processors configured to execute the instructions to: acquire a displacement of a structure on a ground; acquire sensor information related to a surface of the structure; determine a surface layer state of the structure based on the sensor information; and output the displacement and the surface layer state for each section in the structure.

13 Claims, 13 Drawing Sheets

(56) References Cited

FOREIGN PATENT DOCUMENTS

WO 2021/199241 A1 10/2021

OTHER PUBLICATIONS

English translation of Written opinion for PCT Application No. PCT/JP2022/002534, mailed on Apr. 19, 2022.
JP Office Action for JP Application No. 2023-576263, mailed on Sep. 16, 2025 with English Translation.
JP Office Action for JP Application No. 2023-576263, mailed on May 13, 2025 with English Translation.

* cited by examiner

10
INFORMATION PROCESSING SYSTEM
110
DISPLACEMENT ACQUISITION UNIT
OBSERVATION RESULT OR DISPLACEMENT
140
INFORMATION OUTPUT UNIT
DISPLACEMENT AND SURFACE LAYER STATE OF EACH SECTION
120
130
SENSOR INFORMATION
SENSOR INFORMATION ACQUISITION UNIT
STATE DETERMINATION UNIT 80
10
INFORMATION PROCESSING SYSTEM
110
DISPLACEMENT ACQUISITION UNIT
120
SENSOR INFORMATION ACQUISITION UNIT
130
STATE DETERMINATION UNIT
140
INFORMATION OUTPUT UNIT
40
DISPLAY DEVICE
30
GROUND OBSERVATION SYSTEM
20
SENSOR INFORMATION ACQUISITION DEVICE

DETERIORATION OF SURFACE LAYER
LOCATION OF DETERIORATION
DISPLACEMENT OF GROUND
SMALL DISPLACEMENT
MEDIUM DISPLACEMENT
LARGE DISPLACEMENT
DISPLAY OF ENTIRE STRUCTURE
1
2
3
4
5
6
A
B
C
D
STRUCTURE
SECTION 13
83
INFORMATION PROCESSING SYSTEM
30
GROUND OBSERVATION SYSTEM
110
DISPLACEMENT ACQUISITION UNIT
150
INFORMATION STORAGE UNIT
140
INFORMATION OUTPUT UNIT
40
DISPLAY DEVICE
20
SENSOR INFORMATION ACQUISITION DEVICE
120
SENSOR INFORMATION ACQUISITION UNIT
130
STATE DETERMINATION UNIT

←PREVIOUS MONTH
2020/10
NEXT MONTH→
S M T W T F S
SMALL DISPLACEMENT
MEDIUM DISPLACEMENT
LARGE DISPLACEMENT
DISPLAY OF ENTIRE STRUCTURE (2020/10/07)
1 2 3 4 5 6
A B C D
DETAILS OF DETERIORATION OF SECTION
B2
C2
D2
DISPLACEMENT OF SECTION
C1
C2
C3
0
SINK

Fig.8

←PREVIOUS MONTH
2020/04
NEXT MONTH→

| S | M | T | W | T | F | S |
|---|---|---|---|---|---|---|
| | | | | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 19 | 30 | |

GROUND
SMALL DISPLACEMENT
MEDIUM DISPLACEMENT
LARGE DISPLACEMENT

DISPLAY OF ENTIRE STRUCTURE (2020/04/07)
1 2 3 4 5 6
A B C D

DETAILS OF DETERIORATION OF SECTION
D2 C2 B2

DISPLACEMENT OF SECTION
C1 C2 C3
0
SINK

←PREVIOUS MONTH
2020/10
NEXT MONTH→
S M T W T F S
1 2
3 4 5 6 7 8 9
10 11 12 13 14 15 16
17 18 19 20 21 22 23
24 25 26 27 28 29 30
31
SMALL DISPLACEMENT
MEDIUM DISPLACEMENT
LARGE DISPLACEMENT
DISPLAY OF ENTIRE STRUCTURE (2020/10/07)
1 2 3 4 5 6
A B C D
TRANSITION OF DISPLACEMENT OF SECTION
C1 C2 C3
0
SINK
2019/10/07
2020/04/07
2020/10/07

84
830
810
880
NETWORK
820
850
820
850
840
820
850

INFORMATION PROCESSING SYSTEM, INFORMATION PROCESSING METHOD, AND RECORDING MEDIUM

This application is a National Stage Entry of PCT/JP2022/002534 filed on Jan. 25, 2022, the contents of all of which are incorporated herein by reference, in their entirety.

TECHNICAL FIELD

The present invention relates to processing of information, and particularly to processing of information related to a structure.

BACKGROUND ART

PTL 1 discloses an analysis device that divides an observation result of a synthetic aperture radar into a plurality of sections and determines the priority order of the sections using the state values of the sections.

CITATION LIST

Patent Literature

PTL 1: WO 2021/084698 A1

SUMMARY OF INVENTION

Technical Problem

It is often difficult for those other than experts to understand the observation result of the synthetic aperture radar as it is.

It is an object of the present invention to provide an information processing system and the like that make it easier to process information of a structure on the ground based on an observation result of a synthetic aperture radar and the like.

Solution to Problem

An information processing system according to an aspect of the present invention includes a displacement acquisition means for acquiring a displacement of a structure on a ground, a sensor information acquisition means for acquiring sensor information related to a surface of the structure, a state determination means for determining a surface layer state of the structure based on the sensor information, and an information output means for outputting the displacement and the surface layer state for each section in the structure.

An information providing method according to an aspect of the present invention includes acquiring a displacement of a structure on a ground, acquiring sensor information related to a surface of the structure, determining a surface layer state of the structure based on the sensor information, and outputting the displacement and the surface layer state for each section in the structure.

A recording medium according to an aspect of the present invention records a program for causing a computer to execute processing for acquiring a displacement of a structure on a ground, processing for acquiring sensor information related to a surface of the structure, processing for determining a surface layer state of the structure based on the sensor information, and processing for outputting the displacement and the surface layer state for each section in the structure.

Advantageous Effects of Invention

According to the present invention, it is possible to achieve an effect of processing information of a structure more appropriately.

BRIEF DESCRIPTION OF DRAWINGS

FIG. 8 is a diagram illustrating an example of display of another day.

EXAMPLE EMBODIMENT

Next, example embodiments of the present invention will be described with reference to the drawings. However, each example embodiment of the present invention is not limited to the description of each drawing. The example embodiments can be appropriately combined.

First Example Embodiment

Figure 1:
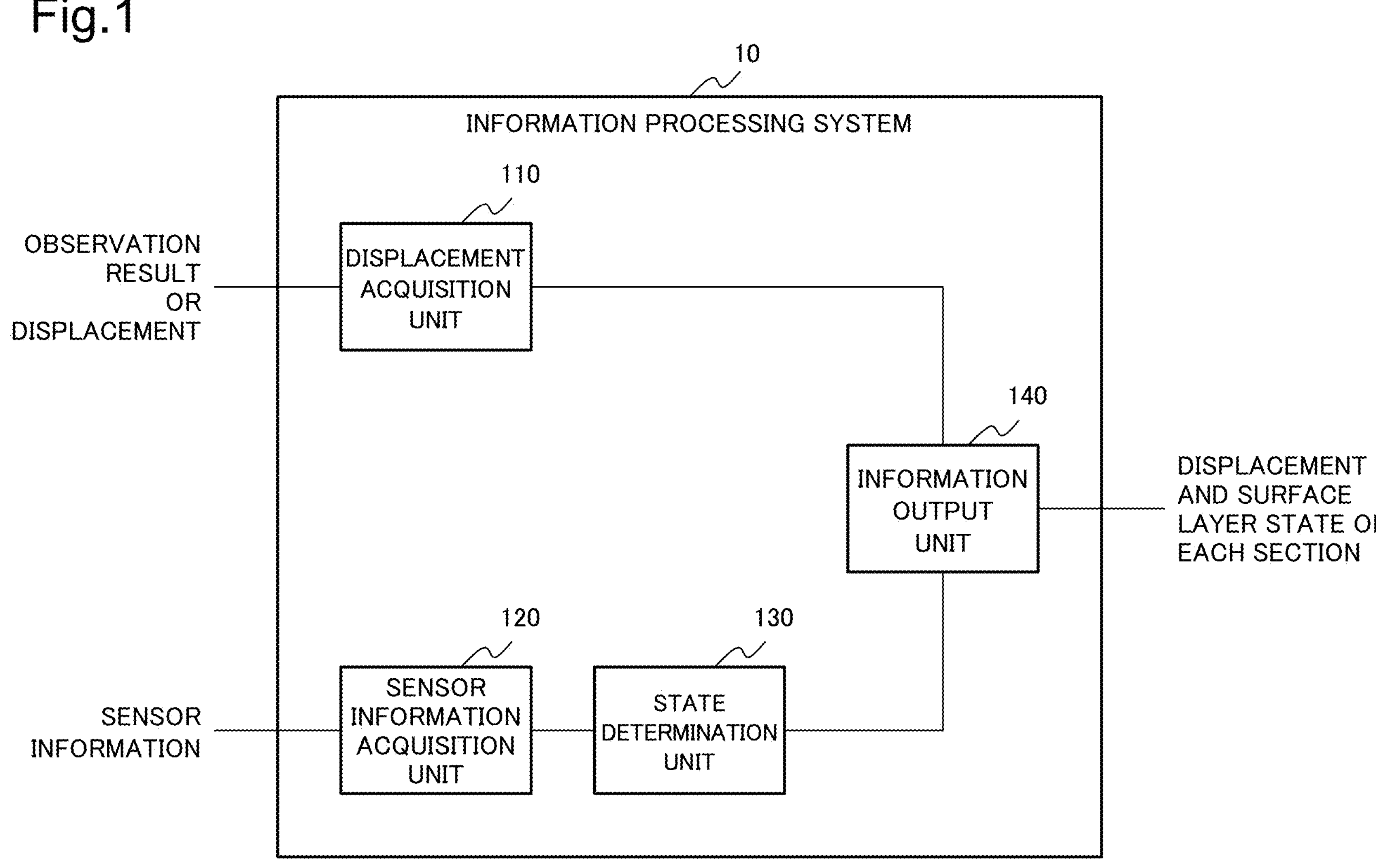
FIG. 1 is a block diagram illustrating an example of the configuration of an information processing system according to a first example embodiment.

A first example embodiment of the present invention will be described with reference to the drawings. FIG. 1 is a block diagram illustrating an example of the configuration of an information processing system 10 according to a first example embodiment. The information processing system 10 includes a displacement acquisition unit 110, a sensor information acquisition unit 120, a state determination unit 130, and an information output unit 140. The displacement acquisition unit 110 acquires a displacement of a structure on the ground. The sensor information acquisition unit 120 acquires sensor information related to the surface of the structure. The state determination unit 130 determines the surface layer state of the structure based on the sensor information. The information output unit 140 outputs the displacement and the surface layer state for each section of the structure. Hereinafter, each configuration will be described in more detail. However, the following description does not limit the first example embodiment.

The displacement acquisition unit 110 acquires a displacement of a structure on the ground. The structure is, for example, a road, a bridge, a slope frame, an embankment, a pier, a bank, or a runway. The structure may include a plurality of structures such as roads and bridges. However, the structure is not limited thereto. For example, the displacement acquisition unit 110 acquires the displacement of the structure by analyzing the observation result of the ground observation system. The ground observation system is, for example, a system including an observation device to observe the ground such as a synthetic aperture radar (SAR). The ground observation system will be further described later. Alternatively, the displacement acquisition unit 110 may acquire the displacement of the structure from the ground observation system. In the following description, these will be collectively described as "displacement acquisition unit 110 acquires a displacement of a structure on the ground".

The sensor information acquisition unit 120 acquires sensor information related to the surface of the structure. For example, the sensor information acquisition unit 120 acquires, as sensor information, a surface image of a road captured by a dashboard camera (dashcam) mounted on the vehicle or acceleration measured by an accelerometer mounted on the vehicle. However, the sensor information is not limited to the above. Hereinafter, devices that acquire sensor information, such as a dashcam, will be collectively referred to as a "sensor information acquisition device". The sensor information acquisition device and the sensor information will be further described later.

The state determination unit 130 determines the surface layer state of the structure based on the sensor information. Specifically, the state determination unit 130 determines a deterioration state of the surface layer. The "surface layer" of the structure is a range in which the state can be checked from the surface of the structure. For example, the surface layer is a portion including a surface and a range from the surface to a predetermined depth. For example, when the structure includes a plurality of layers, the surface layer is a layer of the surface of the structure or a predetermined layer including the layer of the surface. For example, when the structure is an asphalt-paved road, the surface layer is a layer of asphalt. In the following description, a portion excluding the surface layer of the structure is referred to as a "deep layer". For example, when the structure is an asphalt-paved road, the deep layer is a crushed stone layer, a road floor, and a road body. However, the surface layer and the deep layer are not limited to the above. For example, when the structure is an asphalt-paved road, the surface layer may be an asphalt layer and a crushed stone layer.

The information output unit 140 outputs the displacement and the surface layer state for each section of the structure. For example, the information output unit 140 outputs the displacement and the surface layer state for each section to a display device (not illustrated) such as a terminal device including a liquid crystal display. The relationship between the information processing system 10 and the display device is not particularly limited.

The section is a range obtained by dividing the structure according to a predetermined unit or type, such as a unit of management of the structure, a unit of determination of a state of the structure, a unit of repair of the structure, or a combination thereof. For example, the section may be a section corresponding to the user's business or convenience. The section may be set in a range of a part of the structure instead of the entire structure. For example, when the structure is a road, it is difficult to acquire displacement in a range where street trees are planted. Therefore, for example, when the structure is a road, the section may be set in a range excluding a street tree whose displacement is difficult to measure.

The section may have any shape. For example, the shape of the section may be a rectangle, a triangle, or a polygon such as a hexagon. However, the shape of the section is not limited to a polygon. For example, the shape of the section may be any region designated by the user. At least some of the sections may have a shape different from those of the other sections, or may have a size different from those of the other sections. Alternatively, the shape of the section may be a shape in which at least a part of the periphery is curved in accordance with the terrain such as a river. Thus, the shape and size of the section are not limited. The shape and the width may be the same in all the sections, or may be different in at least some of the sections.

Alternatively, the information processing system 10 may acquire an instruction on the shape and location of the structure and the method of setting the section in the structure and set the section based on the instruction. For example, when the structure is rectangular, the information processing system 10 may divide the structure using the instructed number in the vertical direction and the instructed number in the horizontal direction to set the sections. Alternatively, when the method of setting the sections is the length in the vertical direction and the length in the horizontal direction of the sections, the information processing system 10 may sequentially set, as the sections, rectangles having the length in the vertical direction and the length in the horizontal direction included in the setting method from any vertex of the structure. The information processing system 10 may calculate the location of each section by using the location of the structure, the length in the longitudinal direction, and the length in the horizontal direction. In the following description, it is assumed that the information processing system 10 has stored the locations of the structures and the sections.

The displacement of the structure acquired from the ground observation system may be difficult to understand as it is. However, the information output unit 140 outputs the displacement and the surface layer state for each section of the structure. Therefore, the user of the information processing system 10 can determine the state and the like in each section of the structure using the surface layer state in addition to the displacement. For example, there is a high possibility that, among a plurality of sections in which the displacement of the ground is almost the same, a section for which the surface layer is determined to be deteriorated or a section for which the surface layer is determined to be greatly deteriorated repair is required repairs more than the other sections. Therefore, for example, the user of the information processing system 10 can determine a section that requires repair based on the displacement and the surface layer state for each section. As described above, since the information processing system 10 outputs the displacement and the surface layer state, it is possible to process the information of the structure more easily for each section in the structure. For example, the information output unit 140 may use, as the section, a section corresponding to the business or convenience of the user, such as at least one of a unit of managing a structure, a unit of determining a state of a structure, a unit of repairing a structure, or a combination thereof. In this case, the user of the information processing system 10 can more appropriately perform work or the like on each section based on the displacement and the surface layer state of each section.

Second Example Embodiment

Figure 2:
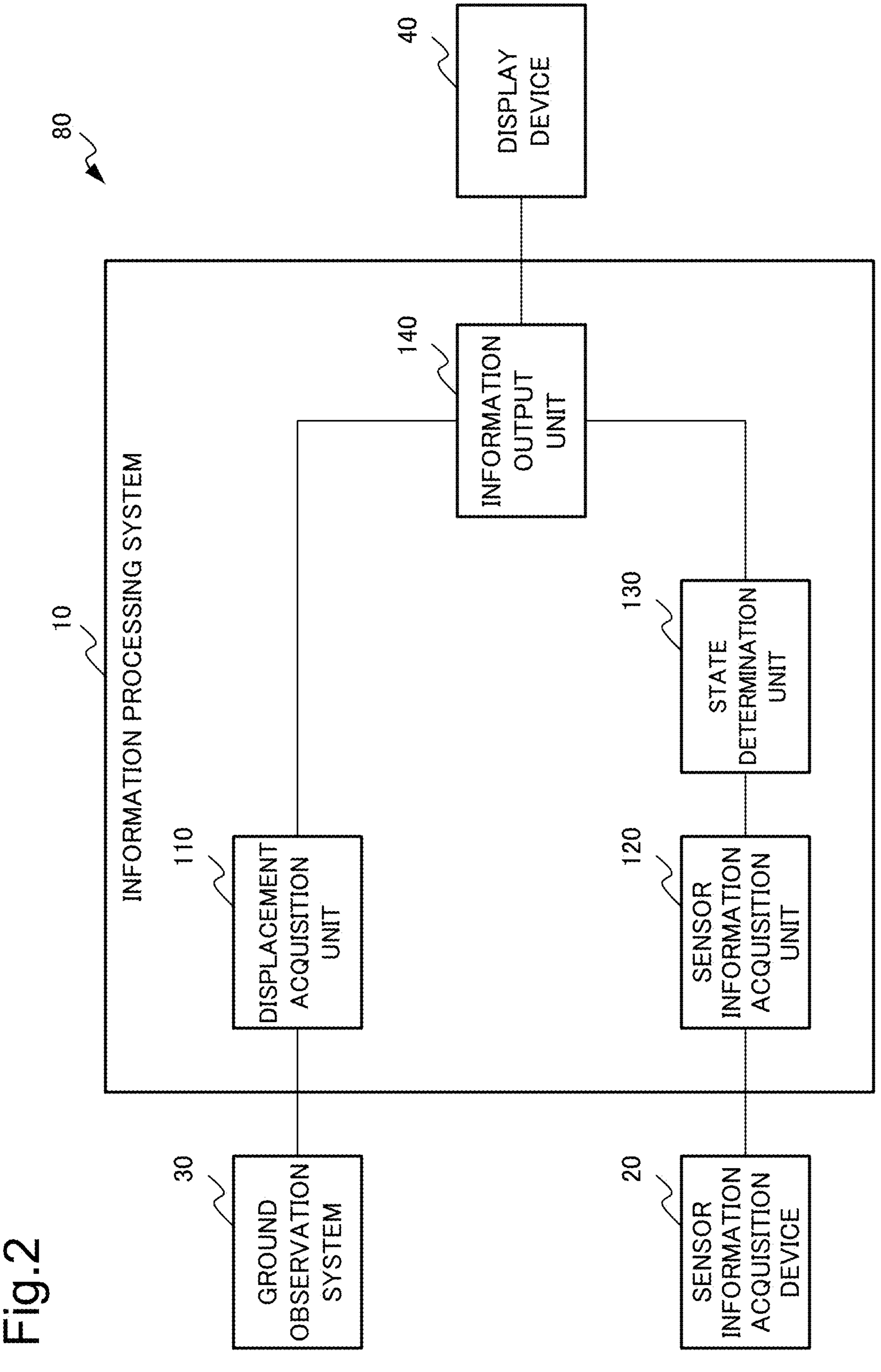
FIG. 2 is a block diagram illustrating an example of the configuration of an information providing system including an information processing system according to a second example embodiment.

An information processing system 10 according to a second example embodiment will be described with reference to the drawings. FIG. 2 is a block diagram illustrating an example of the configuration of an information providing system 80 including the information processing system 10 according to the second example embodiment. The information providing system 80 includes the information processing system 10, a sensor information acquisition device 20, a ground observation system 30, and a display device 40. The number of components in FIG. 2 is an example, and is not limited to the number illustrated in FIG. 2. For example, the information providing system 80 may include a plurality of sensor information acquisition devices 20.

(1) Sensor Information Acquisition Device 20

The sensor information acquisition device 20 includes a predetermined sensor, and acquires sensor information related to the surface of the structure using the sensor. For example, the sensor information acquisition device 20 is mounted on or towed by a moving object moving on the upper surface or in the vicinity of the structure, and acquires sensor information related to the surface of the structure. For example, the sensor information acquisition device 20 is a dashcam that is mounted on a vehicle, which is an example of a moving object, and acquires an image of a road, which is an example of sensor information. Alternatively, the sensor information acquisition device 20 may be a vibratory meter that measures vibration of the vehicle or an accelerometer that measures acceleration in vibration of the vehicle. However, the sensor information acquisition device 20 is not limited to the dashcam, the vibratory meter, and the accelerometer mounted on the vehicle. For example, the sensor information acquisition device 20 may be a fixed device such as a fixed camera installed on a road or beside the road. The sensor information acquisition device 20 may be a device capable of changing performance related to acquisition of sensor information such as an imaging direction and a focal length.

The surface of the structure is not limited to a road surface through which a vehicle or the like passes, and may be any surface in contact with the outside, such as a side wall and an upper surface in a tunnel, and is not particularly limited. The moving object on which the sensor information acquisition device 20 is mounted is not limited to a vehicle. For example, an unmanned aerial vehicle (drone) may move with the sensor information acquisition device 20 mounted thereon. Alternatively, like a wearable dashcam, a person may carry the sensor information acquisition device 20.

The sensor information acquired by the sensor information acquisition device 20 is information related to the surface of the structure. For example, the sensor information is an image of a surface of a structure such as an image of a road surface of a road. However, the sensor information is not limited to the image. For example, the sensor information may be magnitude, speed, or acceleration of vibration generated due to unevenness of the road surface. Alternatively, the sensor information may be three-dimensional data such as data acquired using a radio detecting and ranging (RADAR) or a light detection and ranging (LiDAR). The sensor information may include not one piece of information but a plurality of pieces of information such as a combination of an image and acceleration.

As a specific example of the correspondence among the sensor information acquisition device 20, the sensor, and the sensor information, a case where the sensor information acquisition device 20 is a dashcam mounted on a vehicle will be described. In this case, the sensor is a camera of the dashcam. The sensor information is an image captured by the camera. In the following description, as an example, a dashcam is used as the sensor information acquisition device 20, a camera is used as the sensor, and an image of a surface of a structure is used as an example of the sensor information. A vehicle is used as an example of the moving object.

The sensor information may include other information. Hereinafter, an example of information included in the sensor information will be described.

Identification Information

Information for identifying the sensor information may be included in the sensor information. For example, an identifier may be included in the sensor information. Alternatively, the location where the sensor information is acquired may be included in the sensor information. The location may be a two-dimensional location such as latitude and longitude, or may be a three-dimensional location including height. Alternatively, the time at which the sensor information is acquired may be included in the sensor information. For example, the information processing system 10 may identify the sensor information by using the location and the time included in the sensor information.

Acquisition Device Information

The sensor information acquisition device 20 may be included in the sensor information. For example, the information related to the sensor information acquisition device 20 may include at least one of a device name, a model name, an attachment location, and an imaging direction of the sensor information acquisition device 20. Alternatively, information related to the sensor of the sensor information acquisition device 20 may be included in the sensor information. For example, the information related to the sensor may include at least one of the type, specification, and performance of the sensor. For example, when the sensor is a camera, the information related to the sensor may include at least one of a focal length, an aperture, a diaphragm, a shutter speed, and the number of pixels of the camera.

Moving Object Information

When the sensor information acquisition device 20 is mounted on a moving object, information related to the moving object on which the sensor information acquisition device 20 is mounted may be included in the sensor information. For example, the sensor information may include at least one of a name, a model number, and a type of the moving object. Alternatively, information related to the operation of the moving object may be included in the sensor information. For example, when the moving object is a vehicle, the information related to the operation of the moving object may include information of at least one operation of an accelerator pedal, a brake pedal, a shift lever, a steering wheel, a wiper, a blinker, and opening and closing of a door.

Information about Surroundings

Information about the surroundings when the sensor information is acquired may be included in the sensor information. The information about the surroundings may include, for example, at least one of surrounding weather, temperature, humidity, illuminance, degree of congestion, and sound.

Worker Information

Information related to the worker in charge of acquiring the sensor information may be included in the sensor information. For example, the information related to the worker may include at least one of a name or an identifier of the worker. Alternatively, information added by the worker may be included in the sensor information. For example, the information added by the worker may be a comment of the worker related to at least one of the structures and the sensor information.

(2) Ground Observation System 30

The ground observation system 30 observes a ground including a structure using an observation device and outputs an observation result. For example, the ground observation system 30 includes a SAR for observing the ground including a structure, and outputs an image of the ground as an observation result. The observation device in the ground observation system 30 is, for example, a SAR mounted on an artificial satellite, an aircraft, or an unmanned aerial vehicle (drone). However, the observation device is not limited to the SAR, and may be, for example, an optical sensor or a laser measuring device. The ground observation system 30 may output an observation result using a plurality of frequencies (multi-spectra) instead of one frequency. The ground observation system 30 may analyze the observation result and output the displacement of the ground.

(3) Information Processing System 10

(3-1) Displacement Acquisition Unit 110

The displacement acquisition unit 110 acquires a displacement of a structure on the ground. For example, the displacement acquisition unit 110 acquires the displacement of the structure on the ground based on the observation result of the ground observation system 30 including the SAR that observes the ground including the structure. For example, the displacement acquisition unit 110 acquires an observation result from the ground observation system 30. Then, the displacement acquisition unit 110 acquires the displacement of the structure by analyzing the observation result. For example, the displacement acquisition unit 110 acquires the displacement of the ground between two different times from the analysis using the images of the ground at the two different times. The displacement acquisition unit 110 may acquire the time of the observation.

When the ground observation system 30 outputs the displacement of the ground as a result of analyzing the observation result, the displacement acquisition unit 110 may acquire the displacement of the ground from the ground observation system 30. In this case, the displacement acquisition unit 110 may acquire the location of the displacement of the ground. As described in the first example embodiment, as described above, the displacement acquisition unit 110 may acquire the displacement by analyzing the observation result acquired from the ground observation system 30, or may acquire the displacement from the ground observation system 30. Therefore, in the following description, these will be collectively described as "displacement acquisition unit 110 acquires the displacement of the structure on the ground from the ground observation system 30".

The displacement acquisition unit 110 may perform, as an analysis using the observation result, not only the analysis of the displacement of the ground but also an analysis of a change in intensity of the ground, a factor of the displacement of the ground, the magnitude of a risk based on the displacement of the ground, a difference from prediction based on past displacement of the ground, or the like. When the analysis of a change in intensity of the ground or the like is performed, in the following description, the information processing system 10 may use an analysis result, such as a change in intensity of the ground, instead of the displacement of the ground. For example, the information processing system 10 may output the intensity change of the ground and the surface layer state in each section. Also, when a change in the intensity of the ground or the like is acquired instead of the displacement of the ground, the displacement acquisition unit 110 may acquire the change in the intensity of the ground or the like from the ground observation system 30. Methods for analyzing images of the ground include change extraction, time-series interference analysis, coherent change extraction, and the like. Alternatively, as a method of analyzing an image of the ground, there is a method of analyzing the displacement of the ground by applying a newly acquired image of the ground to an analysis model generated by machine learning using a past image of the ground and a displacement of the ground.

When an observation result using multi-spectra is acquired as an observation result, the displacement acquisition unit 110 may analyze the type of the ground in addition to the displacement of the ground as an analysis of the observation result. The type of the ground that can be analyzed is determined according to the frequency to be used. For example, the type of the ground includes at least one of a water surface, mud, garbage, dry soil, grassland, forest, farmland, and snow cover. Also in this case, the displacement acquisition unit 110 may acquire the type of the ground from the ground observation system 30. However, in the following description, as an example of analysis of observation results, it is assumed that the displacement acquisition unit 110 acquires the displacement of the ground.

When the structure is larger than the spatial resolution of the displacement, displacements of a plurality of locations are displacements relevant to the structure. Therefore, when the structure is larger than the spatial resolution of the displacement, the displacement acquisition unit 110 may acquire the displacements of the plurality of locations relevant to the structure in such a way as to cover the structure. The spatial resolution is the minimum distance at which two objects at a close distance can be distinguished as two objects. For example, the spatial resolution of the displacement is the minimum distance of the two displacements. When acquiring the displacement, the displacement acquisition unit 110 may output the location of the structure or section to the ground observation system 30 and acquire the displacement corresponding to the output location. Alternatively, the displacement acquisition unit 110 may extract the displacement of a location corresponding to a section in a structure from the displacement in a predetermined range including the structure acquired from the ground observation system 30. The displacement acquisition unit 110 may acquire a displacement stored in a storage device (not illustrated). The displacement acquisition unit 110 may acquire a speed of displacement that is a rate of change in displacement during a predetermined period or an acceleration that is a rate of change in speed of displacement.

(3-2) Sensor Information Acquisition Unit 120

The sensor information acquisition unit 120 acquires sensor information related to the surface of the structure. For example, the sensor information acquisition unit 120 acquires sensor information related to the surface of the structure from the sensor information acquisition device 20 mounted on the moving object.

When the structure is larger than the acquisition unit of the sensor information, the sensor information at a plurality of locations is the sensor information relevant to the structure. Therefore, when the structure is larger than the acquisition unit of the sensor information, the sensor information acquisition unit 120 may acquire the sensor information of a plurality of locations relevant to the structure in such a way as to cover the structure. Alternatively, when the information providing system 80 includes a plurality of sensor information acquisition devices 20, the sensor information acquisition unit 120 may acquire the sensor information from the plurality of sensor information acquisition devices 20. In this case, in at least some pieces of sensor information acquired from the plurality of sensor information acquisition devices 20, detection ranges may overlap each other. Alternatively, when acquiring a plurality of pieces of sensor information, the sensor information acquisition unit 120 may acquire sensor information stored in a storage device (not illustrated) as at least a part of the sensor information. The sensor information acquisition unit 120 may output the location of the structure or the section to the sensor information acquisition device 20 and acquire sensor information relevant to the output location. Alternatively, the sensor information acquisition unit 120 may acquire sensor information in a predetermined range including a structure and extract sensor information relevant to the location of the section in the structure from the acquired sensor information.

(3-3) State Determination Unit 130

The state determination unit 130 determines the surface layer state of the structure based on the sensor information. For example, the state determination unit 130 determines the deterioration state of the surface layer of the structure based on the sensor information. As a determination method, the state determination unit 130 may use, for example, a determination model generated by machine learning using sensor information acquired in the past and correct answer data of the surface layer state. Alternatively, when the sensor information is an image, the state determination unit 130 may determine the surface layer state of the road using predetermined image processing. The state determination unit 130 may determine the surface layer state at a plurality of locations for one piece of sensor information. The state determination unit 130 may determine a plurality of types of surface layer states.

As an example of the surface layer state determined by the state determination unit 130, an example of a case where deterioration related to a road is determined will be described. For example, the state determination unit 130 may determine at least one of a crack, a rut, a pothole, deterioration of a seal on a road surface, and fraying of a peripheral portion of the seal as deterioration of the road. The state determination unit 130 may determine the type of the surface layer state. For example, the state determination unit 130 may determine the type of deterioration such as vertical, horizontal, or alligator cracking in a crack. Alternatively, the state determination unit 130 may determine deterioration of an object provided on a surface of a road such as blur of a white line of a road surface and a road surface sign or damage of a sign. Alternatively, the state determination unit 130 may determine a change in the surface such as wear of the surface layer instead of breakage such as a crack. Alternatively, the state determination unit 130 may determine the state of a processed portion of the road surface such as a straight groove for drainage on the road surface or a circular groove for slip prevention on a slope.

The state determination unit 130 may represent the determination result of the surface layer state using a "deterioration degree" which is the degree of deterioration. The deterioration degree of the road surface used by the state determination unit 130 may be a generally used deterioration degree or a deterioration degree set by the user. The state determination unit 130 may use a deterioration speed that is a rate of change in the deterioration degree in a predetermined period or an acceleration that is a rate of change in the deterioration speed. General degrees of deterioration on roads, runways, and the like include the following.

Crack rate: Value obtained by dividing the area of a crack by the area of an examination target.

Rutting amount: Height from a rutting portion to a protrusion in a predetermined range. As the predetermined range, 20 m is often used.

International Roughness Index (IRI): Evaluation index for unevenness of a paved road proposed by the World Bank in 1986.

Boeing Bump Index (BBI): a flatness index adopted by the Federal Aviation Administration in 2009.

(3-4) Information Output Unit 140

The information output unit 140 outputs the displacement and the surface layer state for each section of the structure. The section may include a plurality of displacements and surface layer states. For example, when the size of the section is larger than the spatial resolution of the displacement, displacements of a plurality of locations are displacements relevant to the section. Alternatively, when the size of the section is larger than the spatial resolution of the surface layer state, surface layer states at a plurality of locations are surface layer states relevant to the section. In these cases, the information output unit 140 may output the displacements and surface layer states at all the locations included in the section.

However, the information output unit 140 may output some of the displacements or the surface layer states. For example, the information output unit 140 may output some types of surface layer states such as deterioration in high need of repair. Alternatively, the information output unit 140 may output a displacement larger than a predetermined value among the displacements included in the section. The information output unit 140 may output a value calculated from at least one of displacements and surface layer states included in the section, such as an average value of displacements or the number of deteriorations included in the section.

As an example of the output of a part of the surface layer state, deterioration of a structure will be described. For example, when deterioration of a road includes a crack, a pothole, and a rut, the information output unit 140 may output all of the crack, the pothole, and the rut as deterioration in each section. However, the pothole has a larger influence on passage than cracks and ruts, and is a deterioration that requires a high repair. Therefore, the information output unit 140 may output only the pothole as deterioration in each section.

The information output unit 140 may change at least one of the displacement and the surface layer state to be output corresponding to at least one of the displacement and the surface layer state for each location of the section. For example, significant deterioration may vary depending on the location of the structure. Therefore, the information output unit 140 may change at least one of the displacement and the surface layer state to be output according to deterioration for each location of the section. For example, when the deterioration is a crack or a rut, the information output unit 140 may output both the crack and the rut, or may output either the crack or the rut according to the location of the section. In deterioration of the road, which of a crack and a rut is more required to be repaired may change depending on the location or the type of the road. Typically, cracking increases before the occurrence of the pothole. Therefore, when the deterioration includes a crack and a rut, the information output unit 140 may output the crack for each section. However, for example, in the case of a place where the traveling direction of the vehicle is frequently changed, such as an intersection, there is a higher possibility that a rut affects the operation of the vehicle. Therefore, in the case of a section including an intersection, the information output unit 140 may output a rut for each section.

The spatial resolution of the displacement is often different from the spatial resolution of the surface layer state. Therefore, the number of displacements corresponding to the section may be different from the number of surface layer states corresponding to the section. In this case, the information output unit 140 may output the spatial resolution of either the displacement or the surface layer state in accordance with the spatial resolution of the other.

For example, when the spatial resolution of the displacement is lower than the spatial resolution of the surface layer state, surface layer states at a plurality of locations are included in one displacement range. The spatial resolution of the surface layer state is the minimum distance between the two surface layer states determined using the sensor information. Therefore, the information output unit 140 may combine surface layer states at a plurality of locations included in the range of displacement so as to match the spatial resolution of the displacement. For example, the information output unit 140 may output a representative surface layer state such as deterioration having the highest repair necessity among surface layer states at a plurality of locations included in the displacement range. Alternatively, the information output unit 140 may output the number of surface layer states relevant to the displacement as the surface layer state.

The information output unit 140 may output the displacements and surface layer states of all the sections included in the structure, or may output the displacements and surface layer states of some sections. For example, the information output unit 140 may output the displacement and the surface layer state of the section based on a condition that at least one of the displacement and the surface layer state included in the section is satisfied. For example, the information output unit 140 may output the displacement and the surface layer state of a section whose displacement is larger than a threshold value. Alternatively, the information output unit 140 may output the displacement and the surface layer state of a section in a predetermined surface layer state. The predetermined surface layer state includes, but is not limited to, for example, the number of deteriorations such as cracks is larger than a threshold value, the area of the deterioration is larger than a threshold value, or a predetermined deterioration type such as a pothole. Alternatively, the information output unit 140 may output the displacement and the surface layer state of a section for which both the displacement and the surface layer state satisfy predetermined conditions, such as a section for which the displacement is larger than a threshold value and the number of deteriorations is large. As described above, the information output unit 140 may output the displacement and the surface layer state of the section for which at least one of the displacement and the surface layer state satisfies the predetermined conditions.

In each section, in addition to the displacement and the surface layer state, the information output unit 140 may output a speed that is a rate of change in a change in at least one of the displacement and the surface layer state, an acceleration that is a rate of change in the change speed, or a combination of the speed and the acceleration. For example, when the displacement at a predetermined point increases with the elapse of time, the speed of change in displacement is a speed at which the magnitude of displacement changes. Alternatively, for example, when the surface layer state is deteriorated, the speed of the surface layer state is a speed at which the deterioration of the surface layer progresses. For example, when a crack is used as the surface layer state, the speed of change in the surface layer state is an increasing speed of the crack rate or a speed at which the area of the crack expands. The speed of displacement, the speed of the surface layer state, the acceleration of displacement, and the acceleration of the surface layer state can be calculated based on the accumulated data. For example, the information output unit 140 may output a displacement in each section and a change rate of the displacement. Alternatively, the information output unit 140 may output deterioration and a deterioration speed as the surface layer state.

The displacement and the surface layer state do not always change steadily. Therefore, the speed and the acceleration may change according to the period to be calculated. Therefore, as the calculation period of the speed and the acceleration, the information output unit 140 may use a preset period or may use a period designated by the user for calculation.

The information output unit 140 may output the displacement and the surface layer state of a section for which the speed of at least one of the deterioration and the surface layer state satisfies predetermined conditions. Alternatively, the information output unit 140 may output the displacement and the surface layer state of a section for which the acceleration of at least one of the deterioration and the surface layer state satisfies predetermined conditions. For example, the information output unit 140 may output the deterioration rate or the displacement and the surface layer state of the section for which the change rate of the surface layer state exceeds the threshold value. As described above, the information output unit 140 may output the displacement and the surface layer state of the section based on at least one of the displacement and the surface layer state. Alternatively, the information output unit 140 may output the displacement and the surface layer state of the section based on the speed of change in at least one of the deterioration and the surface layer state. Alternatively, the information output unit 140 may output the displacement and the surface layer state of the section based on acceleration that is a rate of change in the speed of change in at least one of the deterioration and the surface layer state.

The information output unit 140 may output the displacement and the surface layer state of the section based on the priority with respect to the output of the section set based on at least one of the displacement and the surface layer state. For example, the information output unit 140 may output a displacement and a surface layer state of a section having the highest priority, or a displacement and a surface layer state of a section having a priority within a predetermined range. When the priority is set, the information output unit 140 may output the priority set for the section in addition to the displacement and the surface layer state of the section.

Next, an example of the priority will be described. For example, the priority may be set based on the magnitude of the displacement. Specifically, for example, the priority of a section with a large displacement may be set higher than the priority of a section with a small displacement. Alternatively, the priority may be a priority corresponding to the surface layer state. Specifically, for example, when the surface layer state is deterioration of a road, the priority may be a priority corresponding to the number of cracks, a crack rate, or an area of cracks. Alternatively, when the surface layer state includes a type, the priority may be a priority corresponding to the type of the surface layer state. For example, when the surface layer state is deterioration of a road, the pothole is deterioration having a larger influence on passage than cracks or ruts. Therefore, the priority of the section in which the pothole is generated may be set higher than the priority of the section in which the pothole is not generated.

Alternatively, the priority may be set based on a combination of the displacement and the surface layer state. For example, a section having a large displacement and a large number of deteriorations that is one of surface layer states has a high necessity of repair. Therefore, the priority of a section having a large displacement and a large number of deteriorations may be set higher than those of other sections. A section with large displacement and small deterioration and a section with small displacement and large deterioration are sections that require repair more than a section with small displacement and small deterioration. However, the priority of the section with large displacement and small deterioration or the section with small displacement and large deterioration is different depending on the target structure. Therefore, for example, the user may determine priorities of a section having a large displacement and less deterioration and a section having a small displacement and more deterioration in consideration of a structure, easiness of repair, and the like.

Alternatively, the priority of the section may be set based on at least one of the displacement and the surface layer state in the adjacent or neighboring section. For example, there is a high possibility that monitoring is required in a region where sections with displacement larger than a threshold value are gathered. Alternatively, there is a high possibility that monitoring is required in a region where many deteriorated sections are gathered. Therefore, for example, the priority of a section having a large displacement and a large number of deteriorations may be set higher than those of other sections. For example, when the number of sections in which the displacement exceeds the threshold value among the adjacent sections exceeds a predetermined number, the priority of the section for which the plurality of displacements exceed the threshold value may be set higher than those of the other sections. This is because if the displacement of a plurality of adjacent sections is large, it is considered that something has occurred in a predetermined region including the plurality of sections. However, the following description does not limit the priority of the first example embodiment.

The information output unit 140 may output the displacement and the surface layer state of a predetermined location or predetermined type of section. For example, a section of a structure through which many moving objects such as a road or a runway pass includes a section having a high use frequency and a section having a low use frequency. The section having a high use frequency is an important section for the user. Therefore, the information output unit 140 may output the displacement and the surface layer state in the section having a high use frequency.

For example, in a runway of an airport, a section that is a runway on which an airplane actually takes off and lands has a higher use frequency and load than surrounding sections. In this case, the information output unit 140 may output the displacement and the surface layer state in the section serving as the runway on which the airplane actually takes off and lands.

Alternatively, when the structure is a road, the road may include a plurality of types of roads such as a highway and a community road. In this case, the section of the main road has a wider range of influence such as road closure than the section of the community road. In this case, the information output unit 140 may output the displacement and the surface layer state in the section of the main road. As described above, when the structure includes a plurality of types of structures, the degree of necessity of monitoring may be different for each type. Therefore, the information output unit 140 may output the displacement and the surface layer state of the designated type of section. In this manner, the information output unit 140 may output the displacement and the surface layer state of the predetermined location or the predetermined type of section, instead of all sections.

The information output unit 140 may output the displacement and the surface layer state of the designated section. For example, the information output unit 140 may output the displacement and the surface layer state of the section designated by the user. Alternatively, the information output unit 140 may output the displacement and the surface layer state of the section satisfying the conditions designated by the user. The conditions of the section are, for example, conditions satisfied by at least one of the displacement and the surface layer state. Alternatively, the condition of the section may be a condition that the speed of at least one of the deterioration and the surface layer state is satisfied. Alternatively, the condition of the section may be a condition that the acceleration of at least one of the deterioration and the surface layer state is satisfied. Alternatively, the conditions of the section may be a priority of the section. However, the conditions of the section are not limited to the above.

The structure may be divided into groups of a predetermined size. For example, there is a case where a road is managed by being divided into a plurality of portions with an intersection as a division point. Therefore, the sections may be divided corresponding to groups in the structure. When the sections are divided corresponding to groups, the information output unit 140 may output the displacement and the surface layer state of the section of the designated group. Alternatively, the information output unit 140 may output the displacement and the surface layer state of the section based on the conditions satisfied by the group.

(3-5) Information Processing System 10

Figure 3:
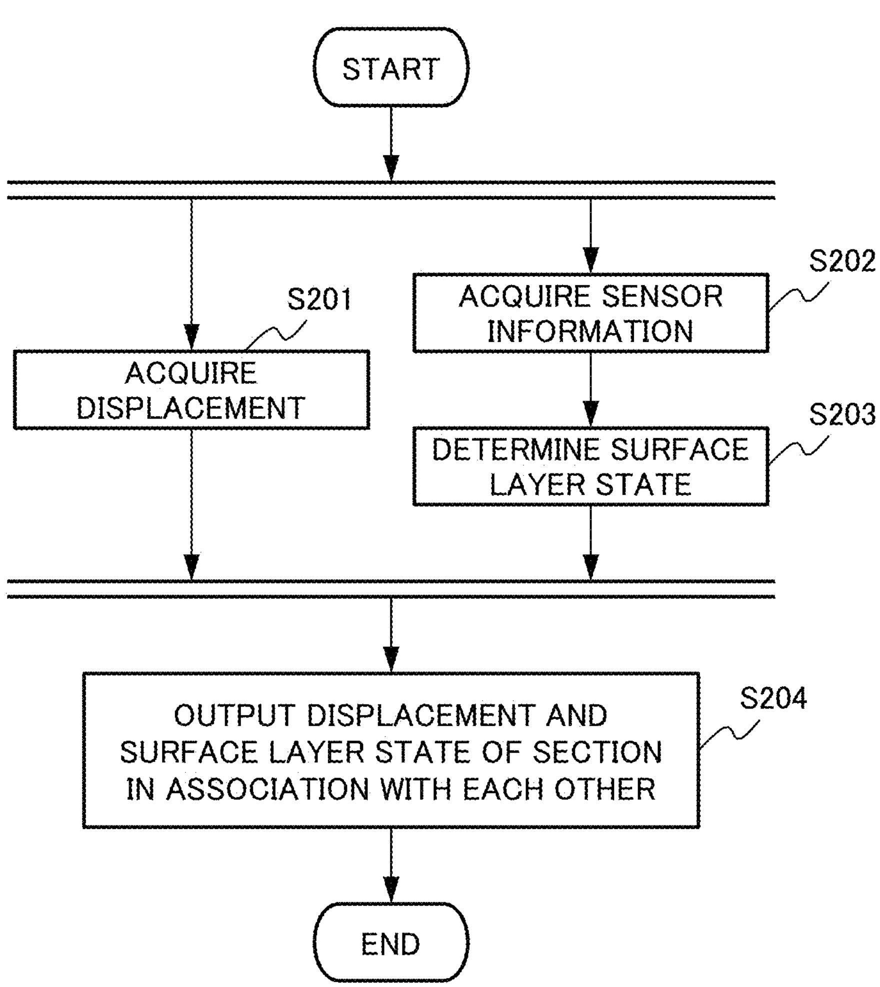
FIG. 3 is a flowchart illustrating an example of an operation of the information processing system according to the second example embodiment.

Next, an operation of the information processing system 10 will be described with reference to the drawings. FIG. 3 is a flowchart illustrating an example of the operation of the information processing system 10 according to the second example embodiment. The displacement acquisition unit 110 acquires a displacement of a structure on the ground (step S201). The sensor information acquisition unit 120 acquires sensor information related to the surface of the structure (step S202). The state determination unit 130 determines the surface layer state of the structure based on the sensor information (step S203). The information output unit 140 outputs the displacement and the surface layer state for each section of the structure (step S204). Either the operation in step S201 or the operations in steps S202 and S203 may be executed first.

As described above, the information processing system 10 operates as in the first example embodiment, and more appropriately processes the information related to the section. The information processing system 10 may operate not for all sections of a target structure but for some sections. In this case, in step S204, the information output unit 140 outputs the displacement and the surface layer state for each section to be operated.

The information processing system 10 may repeat the output of the displacement and the surface layer state every time predetermined conditions are satisfied. For example, the information processing system 10 may output the displacement and the surface layer state according to the timing at which at least one of the displacement and the sensor information is acquired or updated. Alternatively, for example, the information processing system 10 may re-acquire the displacement and the sensor information according to the management cycle of the structure, and repeat the output of the displacement and the surface layer state. Alternatively, the information processing system 10 may re-acquire at least one of the displacement and the sensor information according to a predetermined cycle such as monthly or weekly or an update cycle of at least one of the displacement and the sensor information, and output the displacement and the surface layer state for each section. For example, the information processing system 10 may re-acquire the displacement and the sensor information on a predetermined day of every month and output the displacement and the surface layer state for each section.

Alternatively, when an instruction to output the displacement and the surface layer state is acquired from the user, the information processing system 10 may acquire the displacement and the sensor information and output the displacement and the surface layer state for each section. In this case, the information processing system 10 may output the displacement and the surface layer state of the section designated by the user instead of the entire structure. For example, the information processing system 10 may acquire the displacement of the section designated by the user and the sensor information, determine the surface layer state based on the acquired sensor information, and output the displacement and the surface layer state of the section.

When the operation is repeated, the information processing system 10 may change a section for outputting the displacement and the surface layer state. For example, the information output unit 140 may output the displacements and the surface layer states of all sections at a first time and then output the displacement and the surface layer state of a section for which at least one of the displacement and the surface layer state satisfies predetermined conditions. For example, the information processing system 10 may output a displacement and a surface layer state of a section for which the displacement exceeds a threshold value or a section in a predetermined deterioration state.

The displacement of the structure can be regarded not as deformation of the structure but as displacement including the ground that is the foundation of the structure. Therefore, the displacement of the structure greatly affects the structure. However, the spatial resolution of the displacement is in a wide range to some extent. For example, the spatial resolution of the SAR is often on the order of several meters at the highest.

On the other hand, the spatial resolution of the surface layer state determined using the sensor information acquired from the sensor information acquisition device 20 such as a dashcam is about several centimeters to several tens of centimeters. Therefore, the surface layer state determined by the state determination unit 130 often indicates the state of the surface layer of the structure in more detail than the displacement acquired by the displacement acquisition unit 110. However, the surface layer state may not necessarily be information reflecting the ground state of the structure. For example, the surface layer state may change in association with weather such as rain or snow. In this case, the surface layer state is not a state related to the entire structure, but is an individual state in a part.

Therefore, the information output unit 140 outputs the displacement and the surface layer state for each section of the structure. As described above, the section can be set according to the convenience of the user. That is, the information processing system 10 outputs the displacement and the surface layer state for each section according to the convenience of the user. As a result, the information processing system 10 makes it easier to process the information on the section corresponding to each section of the structure as compared with the case of displacement alone.

(4) Display Device 40

The display device 40 acquires the displacement and the surface layer state of each section output from the information output unit 140, and displays the acquired displacement and surface layer state of the section for each section. As long as the display device 40 can display the displacement and the surface layer state, the type of device and the place where the device is placed do not matter. For example, the display is a display included in a road management system of a local government, but is not limited thereto. The display of the display device 40 in the following description is determined by the information processing system 10. However, the relationship between the information processing system 10 and the display device 40 is not particularly limited. Therefore, in the following description, for convenience of description, there is a case where "the display device 40 changes the display" is described.

Figure 4:
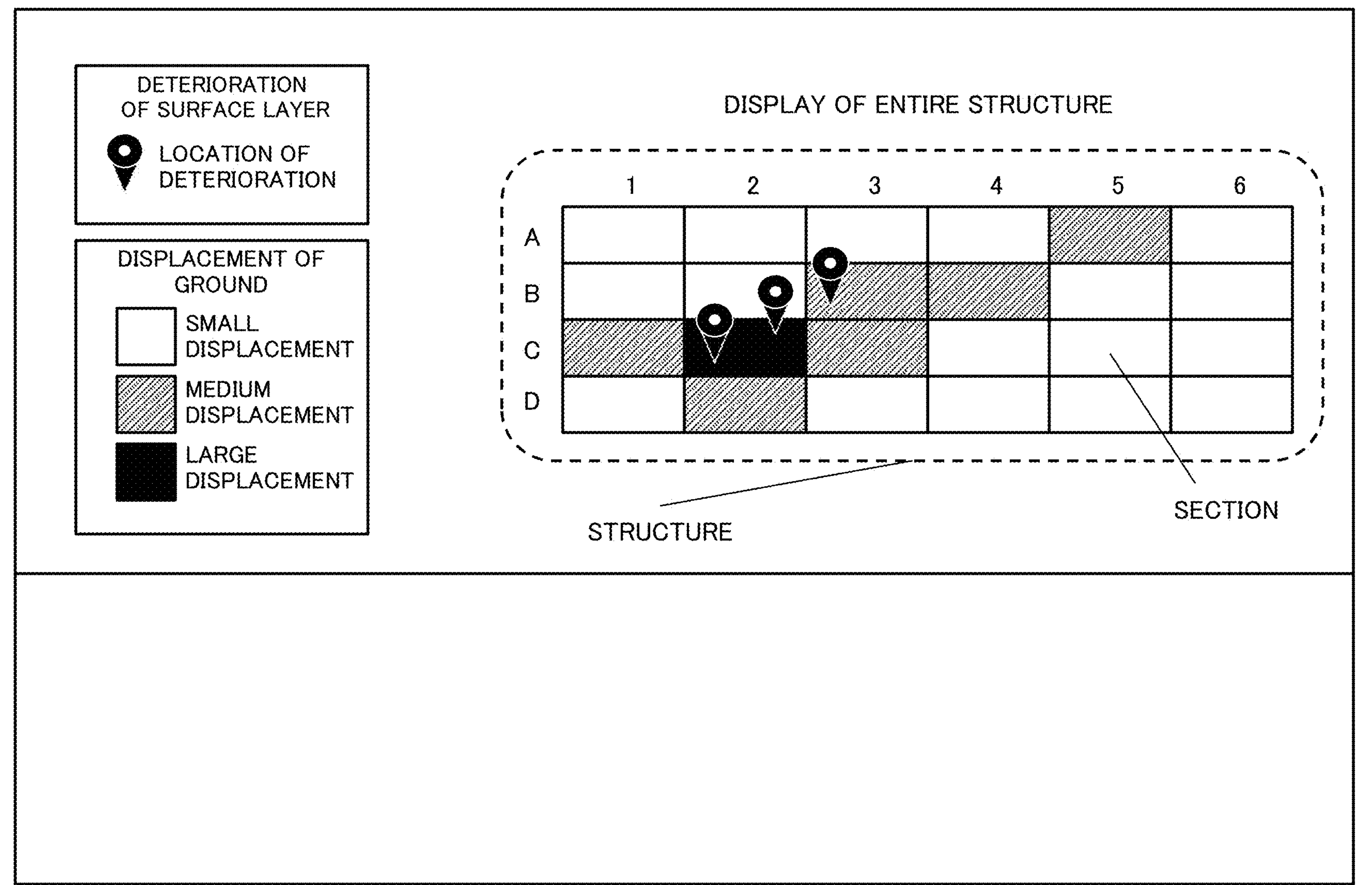
FIG. 4 is a diagram illustrating an example of display of displacement and a surface layer state in each section.

The display of the displacement and the surface layer state on the display device 40 will be described with reference to the drawings. FIG. 4 is a diagram illustrating an example of display of displacement and a surface layer state in each section. In FIG. 4, the display device 40 displays, as sections, sections obtained by dividing the structure into seven sections in the horizontal direction and dividing the structure into four sections in the vertical direction. Then, the display device 40 displays a number indicating a column on the structure and displays an alphabet indicating a row on the left of the structure, as an index indicating a section. In the following description, alphabets and numbers are used to designate rows, columns, and sections in a structure. For example, the third row from the top is row [C], the second column from the left is column [2], and the intersection section is section [C2]. Then, the display device 40 classifies the displacement of each section into three types of large, medium, and small, and changes the display of the section according to the magnitude of the displacement. The display device 40 displays the deterioration using an icon at a location where the deterioration that is an example of the surface layer state is determined. The display device 40 may classify the displacement using any scale and display the section corresponding to the classification, not limited to "large, medium, and small". For example, the display device 40 may classify the displacement in increments of 1 mm and display the section corresponding to the classification.

The display device 40 may display not only the displacement but also the color of the section corresponding to the number, area, or type of surface layer states included in the section. For example, in FIG. 4, the display device 40 may display a color of a section corresponding to the number, area, or type of deterioration instead of the large, medium, and small displacements. Alternatively, the display device 40 may display the color of the section corresponding to the type of the surface layer state. For example, the display device 40 may display a section where a pothole has occurred using a color different from the other sections. The display device 40 may display an icon corresponding to the type of the surface layer state. For example, in FIG. 4, the display device 40 may display an icon at the location of the pothole instead of the deterioration location.

Alternatively, in FIG. 4, the display device 40 may display the color of the section corresponding to the speed of at least one of the displacement and the surface layer state instead of the large, medium, and small displacements. Alternatively, the display device 40 may display the color of the section corresponding to the acceleration of at least one of the displacement and the surface layer state instead of the large, medium, and small displacements. As described above, the display device 40 may display the section corresponding to at least one of the displacement and the surface layer state.

Figure 5:
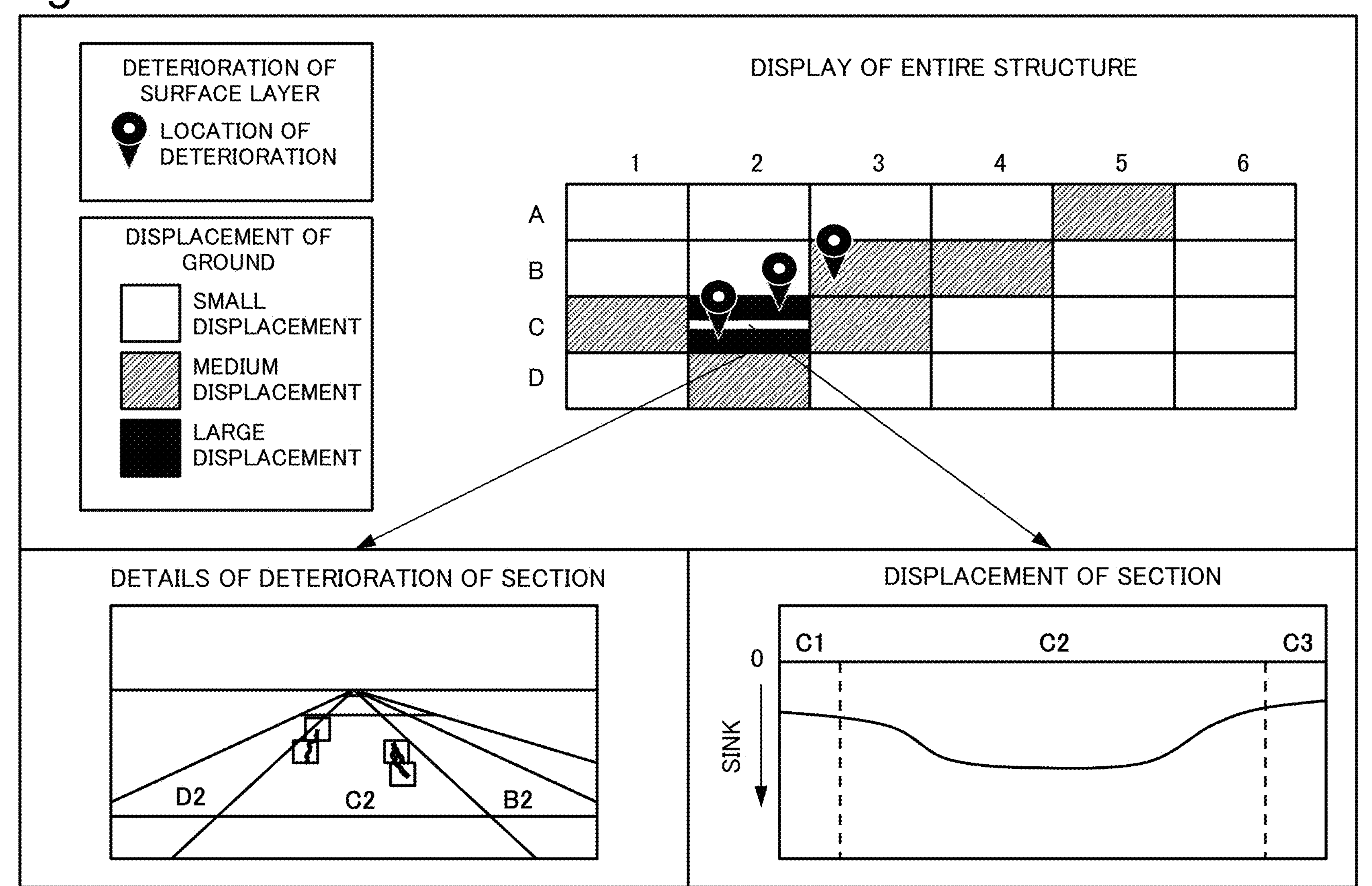
FIG. 5 is a diagram illustrating an example of detailed display of displacement and a surface layer state.

The display device 40 may display details of at least one of the displacement and the surface layer state of the section. For example, the display device 40 may display details of at least one of the displacement and the surface layer state of the designated section. For example, when section [C2] in FIG. 4 is designated, the display device 40 displays details of at least one of the displacement and the surface layer state of section [C2] that is the touch location of the user. FIG. 5 is a diagram illustrating an example of detailed display of displacement and a surface layer state. In FIG. 5, the display device 40 displays details of the displacement and the deterioration state of section [C2]. The display device 40 displays the displacement of section [C2] in the longitudinal direction as details of the displacement of section [C2]. The longitudinal direction of the section is a left-right direction indicated using a white line in section [C2] of FIG. 5. The display device 40 may present details of at least one of the displacement and the surface layer state in a plurality of sections.

The display device 40 displays an image of section [C2] as details of the deterioration of section [C2]. The display device 40 superimposes a square indicating the location of the crack on the image as a reference of the location where the deterioration is detected. The image in FIG. 5 is an image acquired by the dashcam mounted on the vehicle traveling from right to left of the structure in FIG. 5. Therefore, in FIG. 5, the section is a trapezoidal shape in a perspective view having a convergence point near the center of the deterioration image. In order to improve the visibility, the display device 40 may deform the shape of the section to be displayed using predetermined image processing. For example, the display device 40 may change the shape of the section of the trapezoid in the perspective view into a rectangle and display the rectangle.

When the information processing system 10 repeats the operation and outputs the displacement and the surface layer state again for the location and the output section, the display device 40 may display the displacement, the surface layer state, and the acquired section again differently from the other sections. For example, the display device 40 may blink the display of the section for which the displacement and the surface layer state are acquired again, or may display a predetermined figure or icon in the section.

When there are a plurality of pieces of sensor information corresponding to the sections, the display device 40 may display at least either a plurality of pieces of sensor information or surface layer states corresponding to the sections. For example, when an image corresponding to a section has been acquired a plurality of times, the display device 40 may display a plurality of images as images of the section. Alternatively, when the deterioration state is determined based on the plurality of images, the display device 40 may display the plurality of determined deterioration states. When the image is a moving image, the data amount of the image may be enormous. Therefore, for example, the display device 40 may extract and display an image whose deterioration degree is equal to or greater than a threshold value. Alternatively, the display device 40 may extract and display an image including predetermined deterioration such as a pothole. As described above, the display device 40 may extract and display some images based on a predetermined condition or priority. Alternatively, the display device 40 may thin out and display some images based on a predetermined condition or priority, such as thinning out images that do not include deterioration.

Third Example Embodiment

Figure 6:
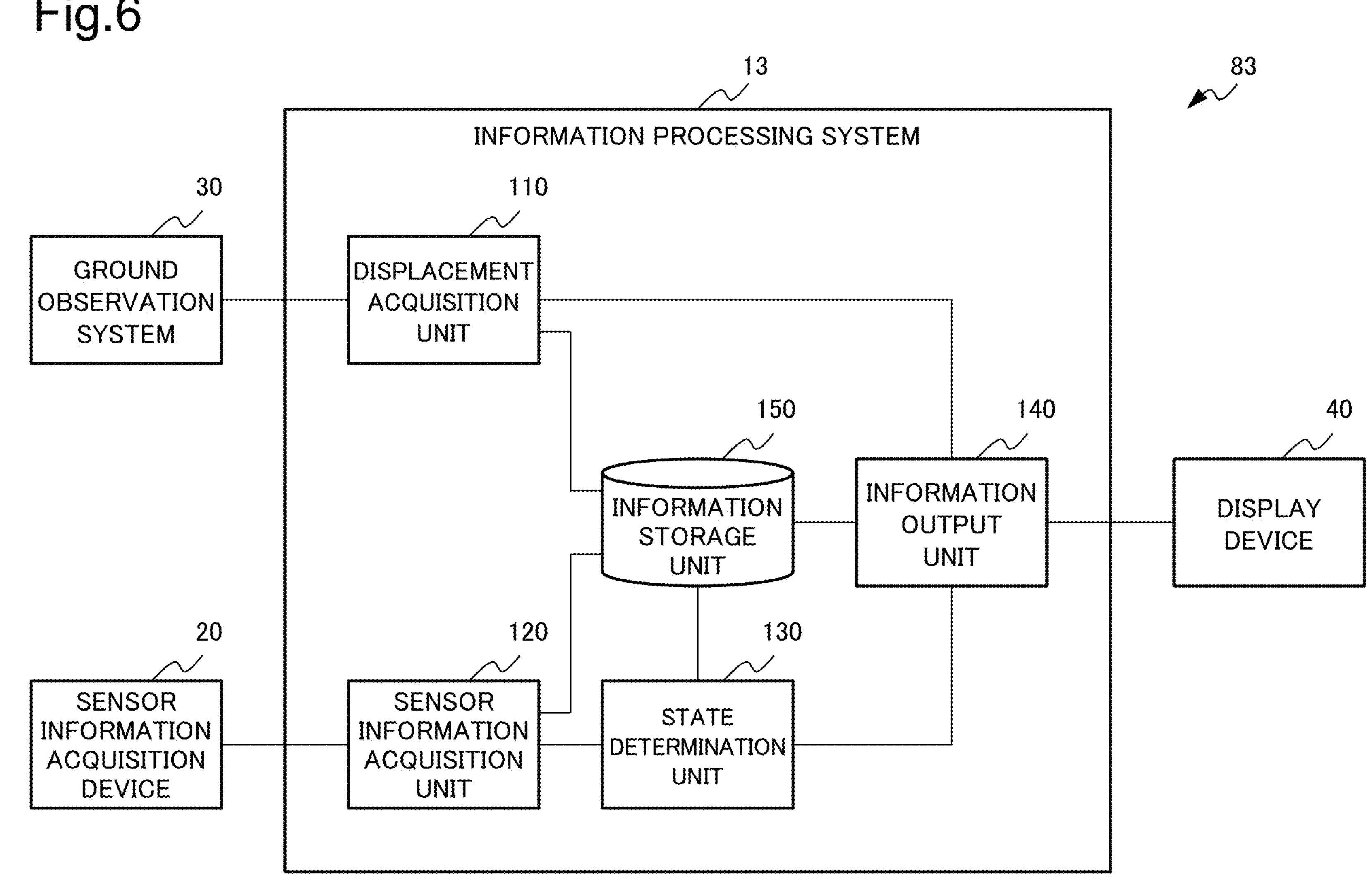
FIG. 6 is a block diagram illustrating an example of the configuration of an information providing system including an information processing system according to a third example embodiment.

FIG. 6 is a block diagram illustrating an example of the configuration of an information providing system 83 including an information processing system 13 according to a third example embodiment. The information providing system 83 includes an information processing system 13 instead of the information processing system 10 in a configuration similar to that of the information providing system 80 according to the second example embodiment. Therefore, the information processing system 13 will be described below, and description of other configurations will be omitted. The information processing system 13 further includes an information storage unit 150 in addition to the same configuration as the information processing system 10.

Therefore, the configuration and operation related to the information storage unit 150 will be mainly described.

In the acquisition of the displacement from the ground observation system 30, the displacement acquisition unit 110 further acquires a time at which the observation device in the ground observation system 30 has observed the ground. The displacement is obtained by analyzing the observation result. Therefore, hereinafter, the time of observation may be referred to as "time of displacement". When a plurality of observation results are used for the analysis of the displacement, the time of displacement is the last observation time. In the acquisition of the sensor information from the sensor information acquisition device 20, the sensor information acquisition unit 120 further acquires the acquisition time of the sensor information. In the determination of the surface layer state, the state determination unit 130 outputs the acquisition time of the sensor information used for the determination as the time of the surface layer state. The information storage unit 150 stores at least either displacements at a plurality of times or surface layer states at a plurality of times in one or more sections. Then, the information output unit 140 outputs the displacement and the surface layer state corresponding to the designated time in each of the one or more sections.

For example, the information storage unit 150 may store the displacement and the time of displacement in association with each other. Alternatively, the information storage unit 150 may store the surface layer state and the time of the surface layer state in association with each other. The information storage unit 150 may store the sensor information and the time of the sensor information in association with each other. In this case, the information output unit 140 may acquire the surface layer state and the time of the surface layer state determined by the state determination unit 130 based on the sensor information at the target time.

The information output unit 140 outputs the displacement and the surface layer state corresponding to the designated time in each of at least some of the sections. For example, the information output unit 140 acquires the displacement and the surface layer state corresponding to the designated time from the information storage unit 150. Then, the information output unit 140 outputs the designated time, displacement, and surface layer state. For example, the information output unit 140 may output the designated time, the displacement, and the surface layer state to the display device 40. In this case, the display device 40 may display the acquired displacement, surface layer state, and time. When the displacement and the surface layer state are newly acquired for the section for which the displacement and the surface layer state have been displayed, the display device 40 may display the newly acquired displacement and surface layer state in addition to the displacement and the surface layer state already displayed. Alternatively, the display device 40 may display the newly acquired displacement and surface layer state instead of the displacement and the surface layer state already displayed.

Figure 7:
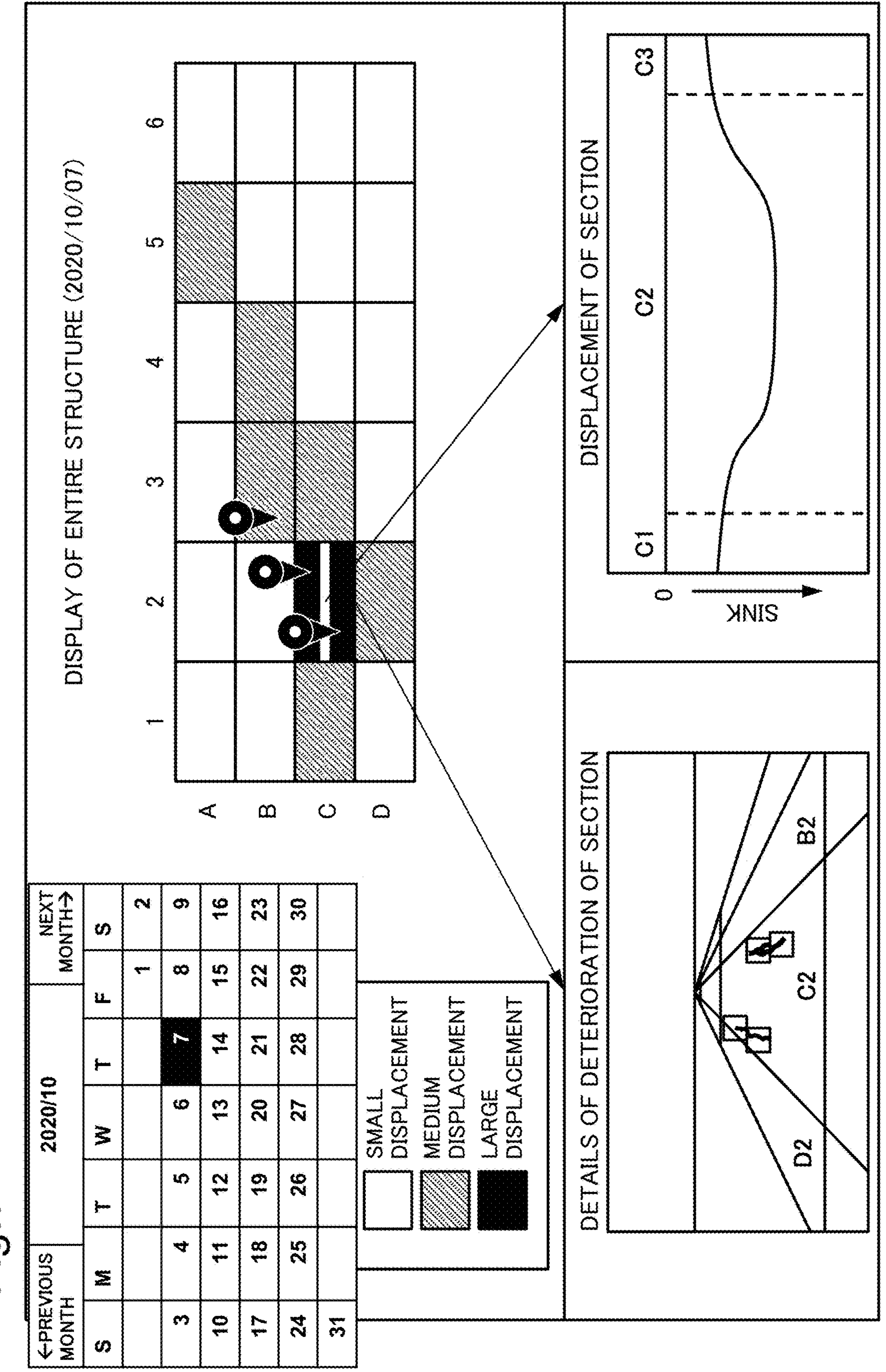
FIG. 7 is a diagram illustrating an example of display according to the third example embodiment.

A case where the information output unit 140 outputs the displacement and the surface layer state corresponding to the designated time will be described with reference to the drawings. FIG. 7 is a diagram illustrating an example of display according to the third example embodiment. FIG. 7 illustrates a displacement and a surface layer state on Oct. 7, 2020 indicated as a calendar. FIG. 7 also shows details of the displacement and the surface layer state. FIG. 8 is a diagram illustrating an example of display of another day. Specifically, FIG. 8 displays the displacement and the surface layer state on Apr. 7, 2020, which is half a year ago in FIG. 7. Comparing FIGS. 7 and 8, the displacement of section [C2] changes from medium to large during half a year. The deterioration, which is the surface layer state of section [C2], has a larger number and wider range of deterioration. As described above, the information processing system 13 processes the displacement and the surface layer state more appropriately for the user than in the second example embodiment.

The information output unit 140 may output the displacement and surface state corresponding to each of a plurality of designated times, not just one time, in at least some sections. For example, the information output unit 140 may output, for each section, displacements and surface layer states corresponding to a plurality of times such as before and after a disaster or before and after construction. For example, the information output unit 140 acquires both the displacement and the surface layer state corresponding to each of the plurality of designated times from the information storage unit 150 for each section. Then, the information output unit 140 may output the acquired displacements and surface layer states at the plurality of times for each section. For example, the information output unit 140 may output the displacements and the surface layer states corresponding to the plurality of times to the display device 40 for each section. In this case, the display device 40 may display the acquired displacements and surface layer states of the section in association with the plurality of times.

Figure 9:
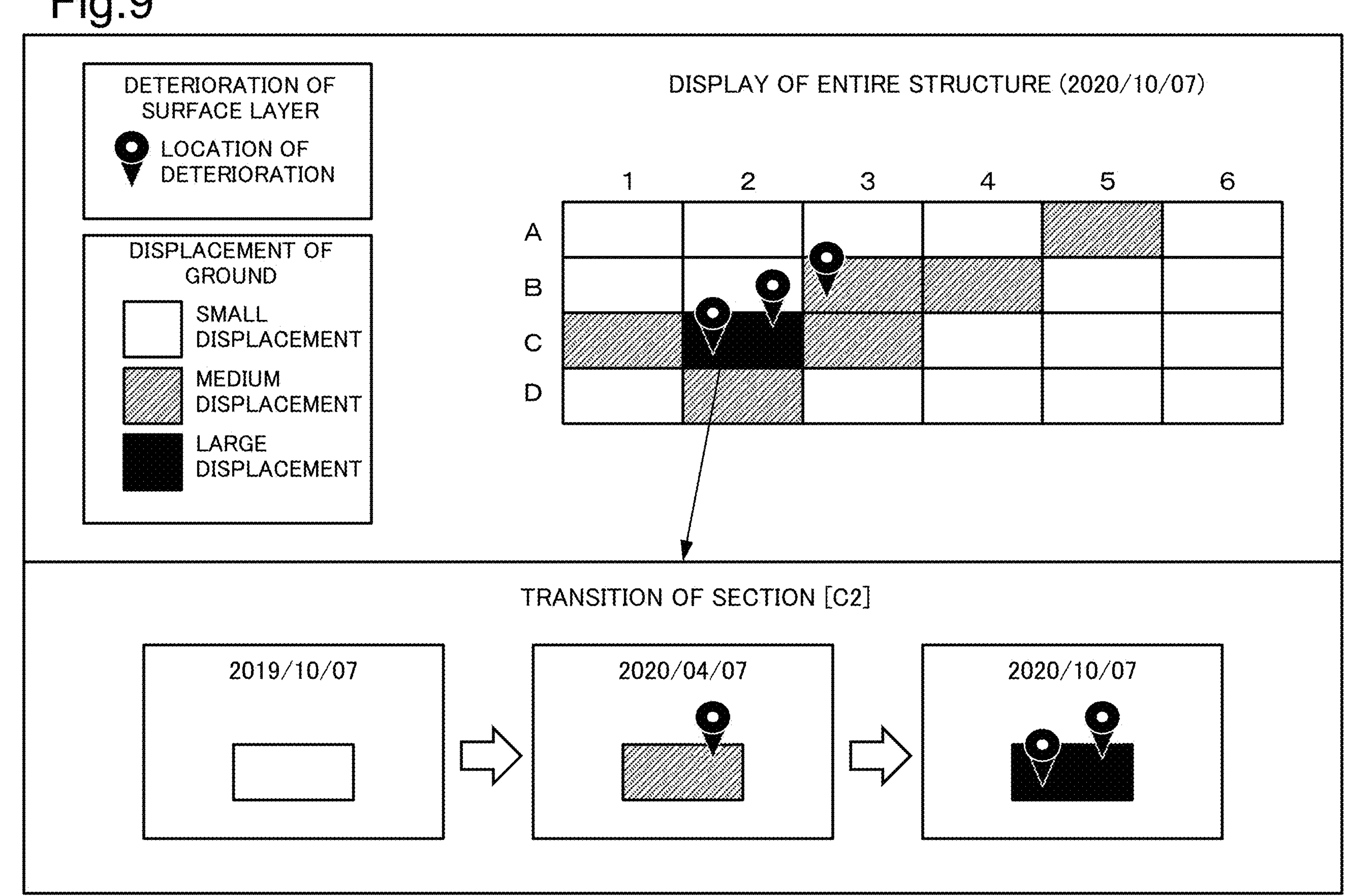
FIG. 9 is a diagram illustrating an example of display of displacement and deterioration corresponding to a plurality of days.
Figure 10:
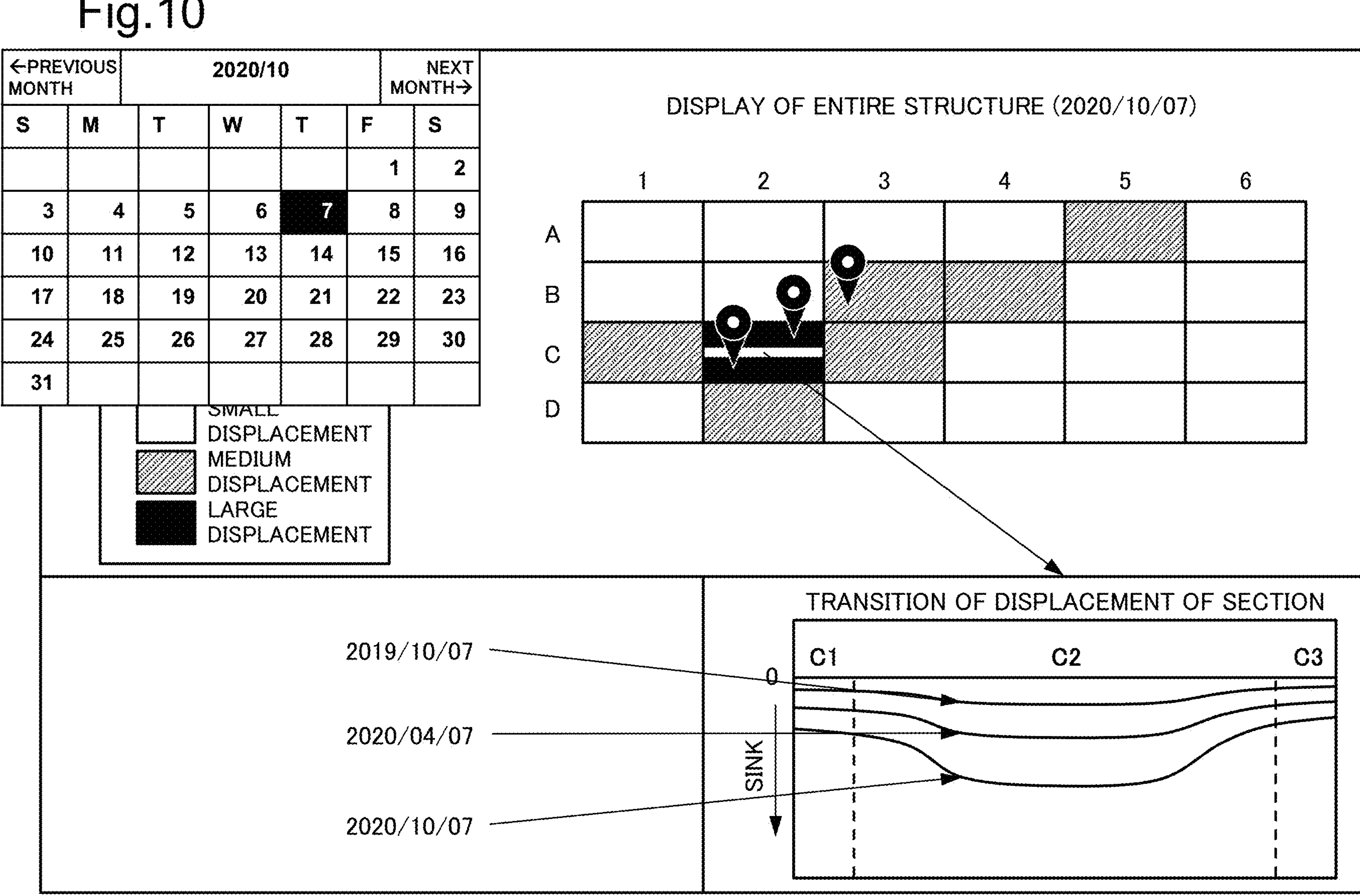
FIG. 10 is a diagram illustrating an example of display of details of displacement corresponding to a plurality of days.

FIG. 9 is a diagram illustrating an example of display of displacement and deterioration corresponding to a plurality of days. FIG. 9 shows a transition of displacement and deterioration of section [C2] for one year. FIG. 10 is a diagram illustrating an example of display of details of displacement corresponding to a plurality of days. FIG. 10 shows a detailed transition of displacement of section [C2] for one year. As described above, the display device 40 may display at least either the displacements or the surface layer states at the plurality of times side by side as display corresponding to the plurality of times, or may display at least either the displacements or the surface layer states at the plurality of times so as to overlap each other. The information output unit 140 may output at least either the displacements or the surface layer states corresponding to a plurality of times in a plurality of sections instead of one section. As a method of designating the time, a designation method different from the calendar display, such as a slide bar, may be used.

The information output unit 140 may output the displacement and the surface layer state of a section based on the priority regarding the output of the section set using at least one of the displacements and the surface layer states at a plurality of times. For example, when the spread of the range of the section with large displacement is accelerated, the spread of the displacement of the ground may be accelerated. Therefore, the priority of a section included in a region where the number of increased sections for which the displacement exceeds a threshold value in a predetermined period is larger than a predetermined number, that is, a region where the number of increased sections for which the displacement is large accelerates may be set higher than the priority of other sections. Then, the information output unit 140 may output the displacement and the surface layer state of the section having a priority higher than the predetermined value.

The information storage unit 150 is not limited to the displacement and the surface layer state, and may store other kinds of information related to the structure or the section. For example, the information storage unit 150 may store a repair history in each section.

In this case, the information output unit 140 may output the displacement and the surface layer state of a section for which the repair history stored in the information storage unit 150 satisfies predetermined conditions. For example, the information output unit 140 may output the displacement and the surface layer state of a section for which the displacement exceeds the threshold value or a section for which the number or area of deterioration exceeds the threshold value within a predetermined time from the previous repair. Alternatively, the information output unit 140 may output the displacement and the surface layer state of a section for which the number of repairs within the predetermined period exceeds the threshold value.

Figure 11:
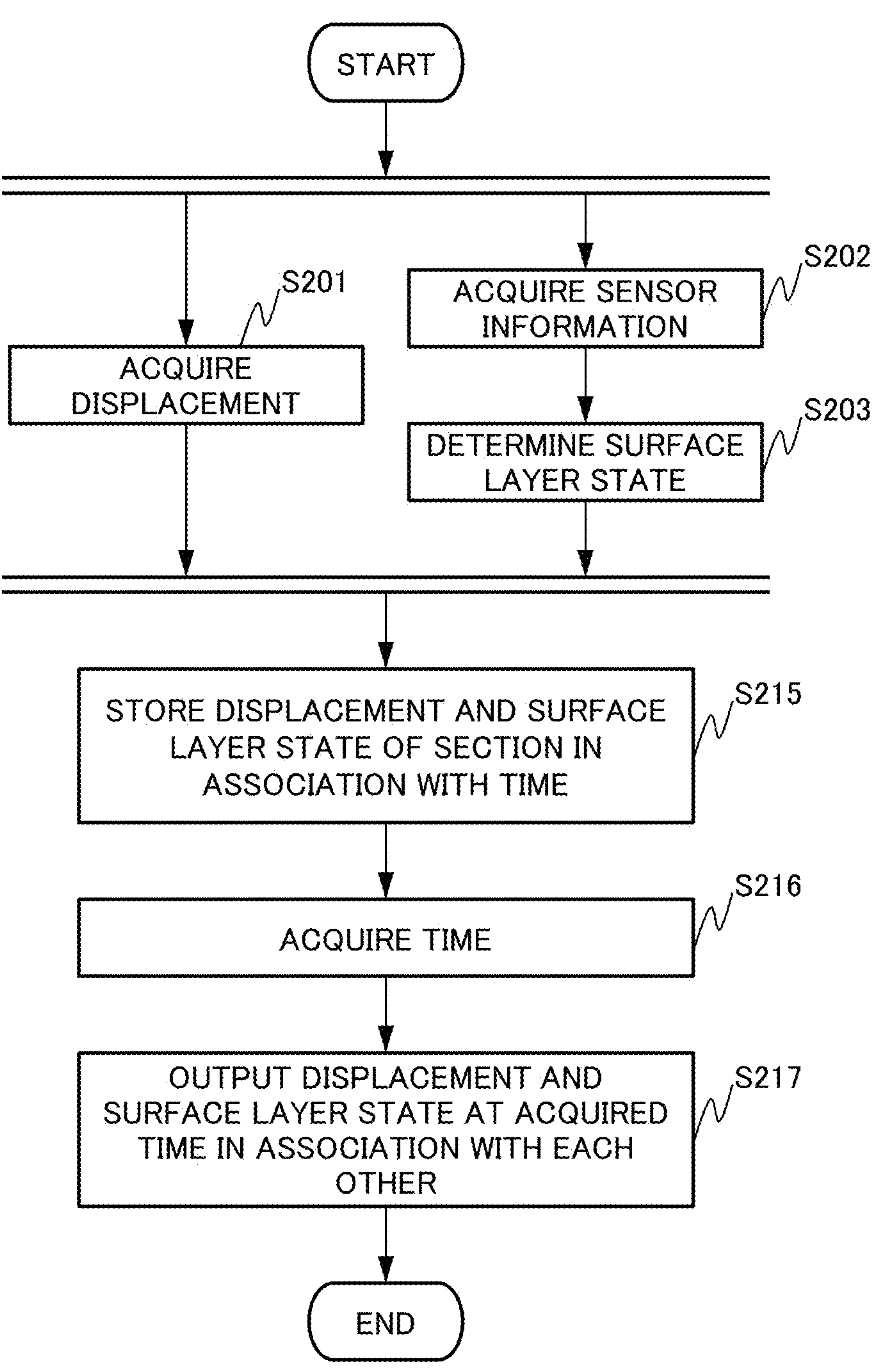
FIG. 11 is a flowchart illustrating an example of an operation of the information processing system according to the third example embodiment.

FIG. 11 is a flowchart illustrating an example of the operation of the information processing system 13 according to the third example embodiment. The displacement acquisition unit 110 acquires a displacement of a structure on the ground (step S201). The sensor information acquisition unit 120 acquires sensor information related to the surface of the structure (step S202). The state determination unit 130 determines the surface layer state of the structure based on the sensor information (step S203). The information storage unit 150 stores the displacement and the time of the displacement, and the surface layer state and the time of the surface layer state in association with each other for each section (step S215). Either the operation in step S201 or the operations in steps S202 and S203 may be executed first.

The information output unit 140 acquires the time of the displacement and the surface layer state (step S216). The information output unit 140 may acquire a plurality of times. The information output unit 140 outputs the displacement and the surface layer state corresponding to the acquired time for each section (step S217). When acquiring a plurality of times, the information output unit 140 may output displacements and surface layer states corresponding to the plurality of times in at least some sections. The information processing system 13 may repeat the operations of steps S216 and S217.

The information processing system 13 may operate not for all sections but for some sections. In this case, in step S216, the information output unit 140 acquires information indicating a section together with time. Then, in step S217, the information output unit 140 outputs information indicating the displacement, the surface layer state, the time, and the section.

The observation time as the basis for displacement analysis may not match the acquisition time of the sensor information that is the basis for determining the surface layer state. That is, the time of the displacement may not match the time of the surface layer state. The observation time and the acquisition time of the sensor information do not necessarily match each other in all the sections, and may be different in at least some of the sections. In such a case, the information output unit 140 outputs the corresponding displacement and surface layer state from among the displacements and surface layer states at different times, in each section.

For example, it is assumed that the information storage unit 150 stores weekly displacements and stores daily surface layer states. It is assumed that a day is designated as the time of the displacement and the surface layer state. In this case, the information output unit 140 may output the surface layer state corresponding to the designated day and the displacement corresponding to the week including the day. Alternatively, when the information storage unit 150 stores the date as the time of displacement, that is, the acquisition date of the observation result used for the analysis of displacement, the information output unit 140 may output the surface layer state corresponding to the designated date and the displacement corresponding to the acquisition date of the observation result closest to the designated date. In this manner, the information output unit 140 may output the corresponding displacement and surface layer state based on a predetermined rule.

The update cycle of the displacement may be different from the update cycle of the surface layer state. Therefore, for example, when the update cycle of the displacement is longer than the update cycle of the surface layer state, the information processing system 13 can acquire a plurality of pieces of sensor information between the acquisition of one displacement to the acquisition of the next displacement. In this case, the information output unit 140 may output the surface layer states at a plurality of times based on the sensor information at a plurality of times with respect to the displacement at one time. Alternatively, when the update period of at least a part of the sensor information is longer than the update period of the displacement, the information output unit 140 may output the displacements at a plurality of times as the displacement and the surface layer state of the section corresponding to the surface layer state at one time. As described above, the information output unit 140 may output different numbers of displacements and surface layer states as the number of times of output, in each section.

<Hardware Configuration>

Next, a hardware configuration of the information processing systems 10 and 13 will be described using the information processing system 10. Each component of the information processing system 10 may be a hardware circuit. Alternatively, in the information processing system 10, each component may be configured using a plurality of devices connected to each other through a network. For example, the information processing system 10 may be configured using cloud computing. Alternatively, in the information processing system 10, the plurality of components may be configured by one piece of hardware.

The information processing system 10 may be implemented as a computer device including a central processing unit (CPU), a read-only memory (ROM), and a random access memory (RAM). In addition to the above configuration, the information processing system 10 may be implemented as a computer device including another configuration such as a network interface card (NIC).

Figure 12:
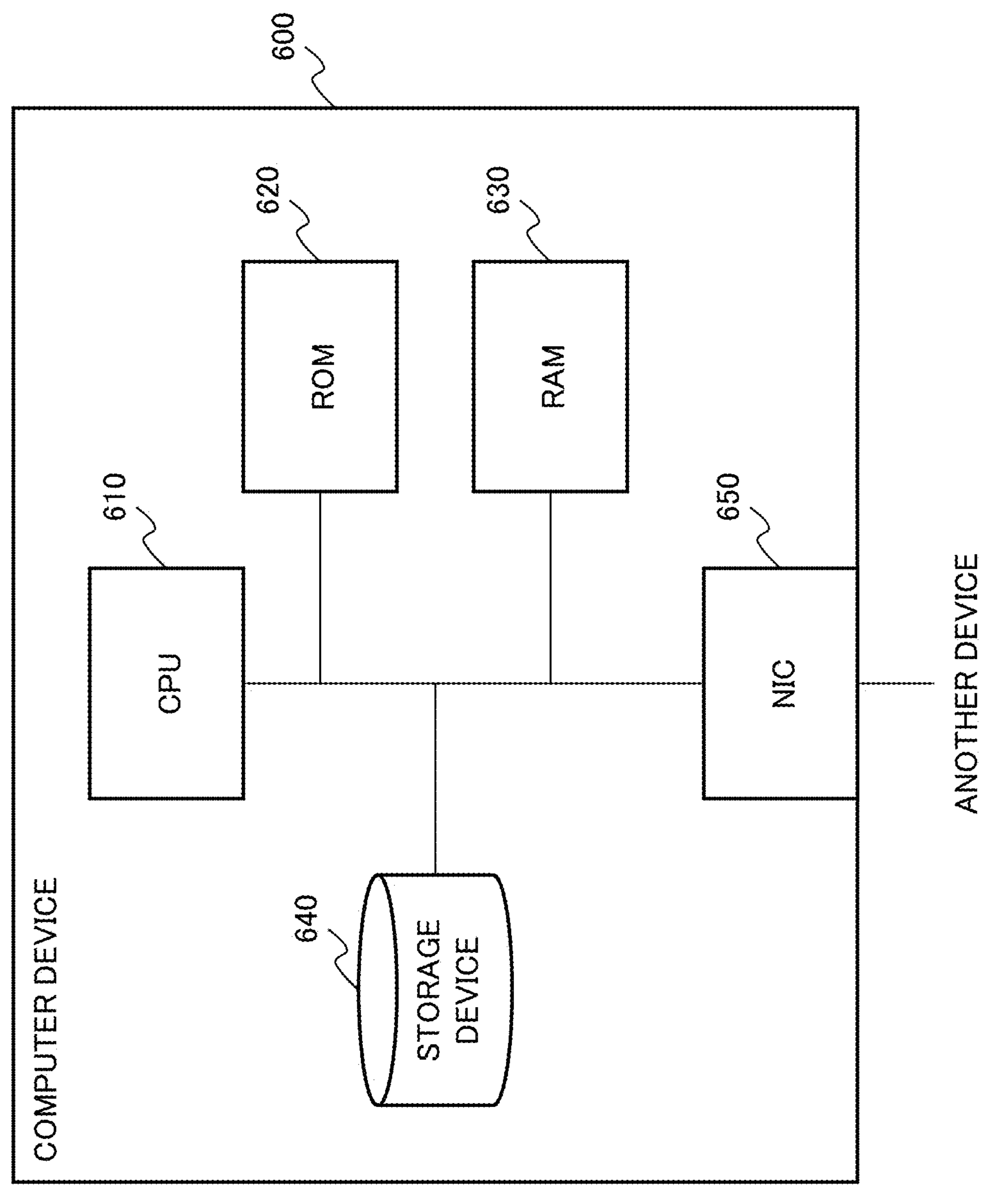
FIG. 12 is a block diagram illustrating an example of the hardware configuration of a computer device forming an information processing system.
Figure 12:
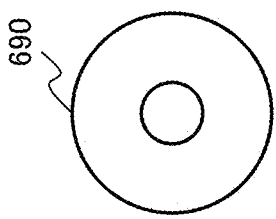

FIG. 12 is a block diagram illustrating an example of a hardware configuration of a computer device 600 forming the information processing system 10. The computer device 600 includes a CPU 610, a ROM 620, a RAM 630, a storage device 640, and an NIC 650. The CPU 610 reads a program from at least one of the ROM 620 and the storage device 640. Then, the CPU 610 controls the RAM 630, the storage device 640, and the NIC 650 based on the read program. Then, the computer device 600 including the CPU 610 controls these components to implement functions as a displacement acquisition unit 110, a sensor information acquisition unit 120, a state determination unit 130, and an information output unit 140 of the information processing system 10.

When implementing each function, the CPU 610 may use at least one of the RAM 630 and the storage device 640 as a temporary storage medium of a program and data. The CPU 610 may read the program included in the recording medium 690 storing the program in a computer readable manner using a recording medium reading device (not illustrated). Alternatively, the CPU 610 may acquire a program from another device (not illustrated) through the NIC 650, store the acquired program in at least one of the RAM 630 and the storage device 640, and operate based on the stored program.

The ROM 620 stores programs executed by the CPU 610 and fixed data. The ROM 620 is, for example, a programmable ROM (Programmable ROM (P-ROM)) or a flash ROM. The RAM 630 temporarily stores at least one of a program executed by the CPU 610 and data. The RAM 630 is, for example, a dynamic RAM (Dynamic-RAM (D-RAM)). The storage device 640 stores data and programs to be stored for a long time by the computer device 600. The storage device 640 may operate as a temporary storage device of the CPU 610. The storage device 640 may operate as the information storage unit 150. The storage device 640 is, for example, a hard disk device, a magneto-optical disk device, a solid state drive (SSD), or a disk array device.

The ROM 620 and the storage device 640 are non-volatile (non-transitory) recording media. On the other hand, the RAM 630 is a volatile (transitory) recording medium. The CPU 610 can operate based on a program stored in at least one of the ROM 620, the storage device 640, and the RAM 630. That is, the CPU 610 can operate using at least one of a nonvolatile recording medium and a volatile recording medium.

The NIC 650 relays exchange of data with another apparatus (not illustrated) through a network. The NIC 650 is, for example, a local area network (LAN) card. The NIC 650 is not limited to wired communication, and may be wireless communication. In the computer device 600 configured as described above, the CPU 610 implements a function similar to that of the information processing system 10 or 13 based on the program.

<Specific Example of Information Providing System>

Figure 13:
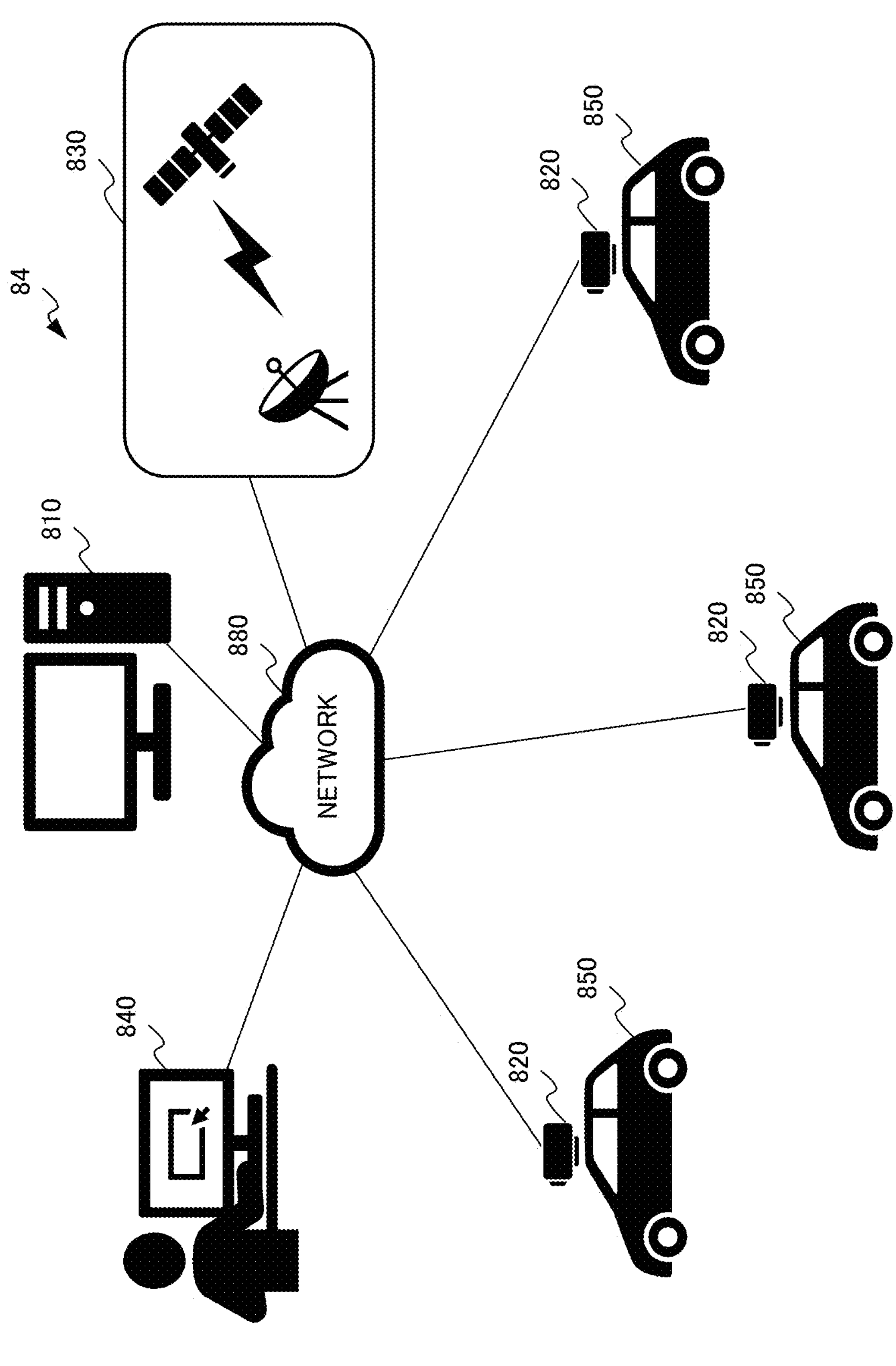
FIG. 13 is a conceptual diagram illustrating a specific example of an information providing system.

FIG. 13 is a conceptual diagram illustrating an information providing system 84 which is a specific example of the information providing systems 80 and 83. In the information providing system 84, the subject of each configuration may be the same or different. In FIG. 13, a computer device 810 is an example of the information processing system 10. The dashcam 820 is an example of the sensor information acquisition device 20. A SAR system 830 including an artificial satellite equipped with the SAR and a ground station is an example of the ground observation system 30. A terminal device 840 is an example of the display device 40. A vehicle 850 is an example of a moving object that moves with the dashcam 820 mounted thereon. In FIG. 13, in order to facilitate understanding, the dashcam 820 is mounted outside the vehicle 850. However, the dashcam 820 may be mounted inside the vehicle 850.

The network 880 is a communication path that connects each device and each system to each other. For example, the network 880 may be the Internet, a public telephone line, a dedicated communication network, or a combination thereof. However, the network 880 is not limited to the above, and may be any communication path as long as the communication path can connect each device and each system to each other. The network 880 may be configured using a plurality of networks instead of one network. For example, as described below, the network 880 may be configured using different networks as networks used for connection between the computer device 810 and another device or system.

Connection between computer device 810 and dashcam 820,

Connection between computer device 810 and SAR system 830,

Connection between computer device 810 and terminal device 840.

Alternatively, when there are a plurality of dashcams 820, a plurality of networks corresponding to the location of the dashcam 820 may be used for the network 880 as connections between the computer device 810 and the dashcam 820.

As described above, the number of components included in FIG. 13 is an example, and is not limited to the number illustrated in FIG. 13. For example, one, two, or four or more dashcams 820 may be provided. The components illustrated in FIG. 13 can be replaced with other devices or systems. For example, at least some of the dashcams 820 may be mounted on a moving object different from the vehicle 850, such as a drone. Alternatively, the dashcam 820 may be replaced with a fixed camera.

The vehicle 850 travels on a structure, such as a road or a bridge, with the dashcam 820 mounted thereon. The vehicle 850 may travel in a structure, such as a tunnel. The dashcam 820 acquires sensor information of a structure, such as a road or a bridge on which the vehicle 850 travels, and outputs the acquired sensor information to the computer device 810. For example, the dashcam 820 acquires an image and acceleration as sensor information, and outputs the image and acceleration to the computer device 810. The SAR system 830 outputs an observation result of the ground to the computer device 810. Alternatively, the SAR system 830 analyzes the observations and outputs the displacement of the ground including the structures.

The computer device 810 acquires the sensor information from the dashcam 820 and determines the surface layer state of the structure based on the acquired sensor information. The computer device 810 acquires observation results from the SAR system 830, and analyzes the acquired observation results to acquire the displacement of the structure. Alternatively, the computer device 810 acquires the displacement of the structure from the SAR system 830. That is, the computer device 810 acquires the displacement of the structure that is the result of the analysis using the observation result acquired by the SAR system 830. Then, the computer device 810 outputs the displacement and the surface layer state to the terminal device 840 in each section. The terminal device 840 displays the displacement and the surface layer state in each section acquired from the computer device 810.

As the computer device 810, the dashcam 820, the SAR system 830, the terminal device 840, and the vehicle 850, generally available products and systems can be applied. For example, a general personal computer may be used as the computer device 810. As described above, the devices and systems used as the computer device 810, the dashcam 820, the SAR system 830, the terminal device 840, and the vehicle 850 are not particularly limited.

Some or all of the above example embodiments may be described as in the following Supplementary Notes, but are not limited to the following description.

(Supplementary Note 1)

An information processing system, including:

a displacement acquisition means for acquiring a displacement of a structure on a ground;

a sensor information acquisition means for acquiring sensor information related to a surface of the structure;

a state determination means for determining a surface layer state of the structure based on the sensor information; and an information output means for outputting the displacement and the surface layer state for each section in the structure.

(Supplementary Note 2)

The information processing system according to Supplementary Note 1, in which the information output means outputs the displacement and the surface layer state of the section based on at least one of the displacement and the surface layer state.

(Supplementary Note 3)

The information processing system according to Supplementary Note 2, in which the information output means outputs the displacement and the surface layer state of the section based on at least one of a speed of change in at least one of the displacement and the surface layer state and an acceleration that is a rate of change in the speed of change in at least one of the displacement and the surface layer state.

(Supplementary Note 4)

The information processing system according to any one of Supplementary Note 2 or 3, in which the information output means outputs the displacement and the surface layer state of the section based on a priority of the section set based on at least one of the displacement and the surface layer state.

(Supplementary Note 5)

The information processing system according to any one of Supplementary Notes 1 to 4, in which the information output means outputs the displacement and the surface layer state of the section at a predetermined location or with a predetermined type.

(Supplementary Note 6)

The information processing system according to any one of Supplementary Notes 1 to 5, in which the information output means outputs the displacement and the surface layer state of the section designated.

(Supplementary Note 7)

The information processing system according to any one of Supplementary Notes 1 to 6, further including:

an information storage means for storing at least one of the displacement at a plurality of times and the surface layer state at a plurality of times in one or more sections, in which the information output means outputs the displacement and the surface layer state corresponding to a designated time in each of the one or more sections.

(Supplementary Note 8)

The information processing system according to Supplementary Note 7, in which the information output means outputs the displacement and the surface layer state corresponding to each of a plurality of designated times.

(Supplementary Note 9)

The information processing system according to any one of Supplementary Notes 1 to 8, in which the section is at least one of a unit of management of the structure, a unit of determination of a state of the structure, a unit of repair of the structure, and a combination thereof.

(Supplementary Note 10)

The information processing system according to any one of Supplementary Notes 1 to 9, in which the sensor information acquisition means acquires the sensor information acquired by a sensor information acquisition device mounted on a moving object.

(Supplementary Note 11)

The information processing system according to Supplementary Note 10, in which the moving object is a vehicle, the sensor information acquisition device is a dashcam, and the sensor information is an image of a surface of the structure.

(Supplementary Note 12)

The information processing system according to any one of Supplementary Notes 1 to 11, in which the displacement acquisition means acquires the displacement of the structure based on an observation result of a ground observation system including a synthetic aperture radar that observes the ground including the structure.

(Supplementary Note 13)

An information processing method, including:

acquiring a displacement of a structure on a ground;

acquiring sensor information related to a surface of the structure;

determining a surface layer state of the structure based on the sensor information; and outputting the displacement and the surface layer state for each section in the structure.

(Supplementary Note 14)

A recording medium that records a program for causing a computer to execute:

processing for acquiring a displacement of a structure on a ground;

processing for acquiring sensor information related to a surface of the structure;

processing for determining a surface layer state of the structure based on the sensor information; and processing for outputting the displacement and the surface layer state for each section in the structure.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

REFERENCE SIGNS LIST

10 information processing system
13 information processing system
20 sensor information acquisition device
30 ground observation system
40 display device
80 information providing system
83 information providing system
84 information providing system
110 displacement acquisition unit
120 sensor information acquisition unit
130 state determination unit
140 information output unit
150 information storage unit
600 computer device
610 CPU
620 ROM
630 RAM
640 storage device
650 NIC
810 computer device
820 dashcam
830 SAR system
840 terminal device
850 vehicle
880 network

What is claimed is:

1. An information processing system, comprising:

a memory configured to store instructions; and one or more processors configured to execute the instructions to:

acquire a displacement of a ground under a structure based on an observation result of a ground observation system, which comprises a synthetic aperture radar that observes the ground including the structure, wherein the displacement represents a change in position of the ground between two different times and indicates a state of a deep layer of the structure;

acquire sensor information related to a surface of the structure;

determine a surface layer state of the structure based on the sensor information; and output the displacement of the ground indicating the state of the deep layer and the surface layer state for each section in the structure.

2. The information processing system according to claim 1, wherein the one or more processors are further configured to execute the instructions to:

output the displacement and the surface layer state of the section based on at least one of the displacement and the surface layer state.

3. The information processing system according to claim 2, wherein the one or more processors are further configured to execute the instructions to:

output the displacement and the surface layer state of the section based on at least one of a speed of change in at least one of the displacement and the surface layer state and an acceleration that is a rate of change in the speed of change in at least one of the displacement and the surface layer state.

4. The information processing system according to claim 2, wherein the one or more processors are further configured to execute the instructions to:

output the displacement and the surface layer state of the section based on a priority of the section set based on at least one of the displacement and the surface layer state.

5. The information processing system according to claim 1, wherein the one or more processors are further configured to execute the instructions to:

output the displacement and the surface layer state of the section at a predetermined location or with a predetermined type.

6. The information processing system according to claim 1, wherein the one or more processors are further configured to execute the instructions to:

output the displacement and the surface layer state of the section designated.

7. The information processing system according to claim 1, wherein the one or more processors are further configured to execute the instructions to:

store at least one of the displacement at a plurality of times and the surface layer state at a plurality of times in one or more sections; and output the displacement and the surface layer state corresponding to a designated time in each of the one or more sections.

8. The information processing system according to claim 7, wherein the one or more processors are further configured to execute the instructions to:

output the displacement and the surface layer state corresponding to each of a plurality of designated times.

9. The information processing system according to claim 1, wherein the section is at least one of a unit of management of the structure, a unit of determination of a state of the structure, a unit of repair of the structure, and a combination thereof.

10. The information processing system according to claim 1, wherein the one or more processors are further configured to execute the instructions to:

acquire the sensor information acquired by a sensor information acquisition device mounted on a moving object.

11. The information processing system according to claim 10, wherein the moving object is a vehicle, the sensor information acquisition device is a dashcam, and the sensor information is an image of a surface of the structure.

12. An information processing method, the method comprising:

acquiring a displacement of a ground under a structure based on an observation result of a ground observation system, which comprises a synthetic aperture radar that observes the ground including the structure, wherein the displacement represents a change in position of the ground between two different times and indicates a state of a deep layer of the structure;

acquiring sensor information related to a surface of the structure;

determining a surface layer state of the structure based on the sensor information; and outputting the displacement of the ground indicating the state of the deep layer and the surface layer state for each section in the structure.

13. A non-transitory computer-readable recording medium that records a program for causing a computer to execute:

acquiring a displacement of a ground under a structure based on an observation result of a ground observation system, which comprises a synthetic aperture radar that observes the ground including the structure, wherein the displacement represents a change in position of the ground between two different times and indicates a state of a deep layer of the structure;

acquiring sensor information related to a surface of the structure;

determining a surface layer state of the structure based on the sensor information; and outputting the displacement of the ground indicating the state of the deep layer and the surface layer state for each section in the structure.

* * * * *